United States Patent [19]
Fried

[11] 3,859,309
[45] Jan. 7, 1975

[54] PRODUCTION OF UNSATURATED CARBOCYCLIC KETONES
[75] Inventor: John H. Fried, Palo Alto, Calif.
[73] Assignee: Syntex Corporation, Panama, Panama
[22] Filed: Nov. 16, 1971
[21] Appl. No.: 199,389

Related U.S. Application Data
[60] Division of Ser. No. 773,356, Nov. 4, 1968, Pat. No. 3,658,847, which is a continuation-in-part of Ser. No. 747,466, July 25, 1968, abandoned, and a continuation-in-part of Ser. No. 687,477, Dec. 4, 1967, Pat. No. 3,524,886.

[52] U.S. Cl. ...... 260/340.9, 260/307 R, 260/327 M, 260/343.2 S, 260/343.3, 260/345.9, 260/468 G, 260/488 B, 260/514 G, 260/586 H, 260/590
[51] Int. Cl............................................. C07d 13/04

[58] Field of Search ...... 260/397.4; 260/340.9, 307, 260/488 B, 345.9, 327, 586 H, 590

[56] References Cited
OTHER PUBLICATIONS
Hendrick et al., "J.A.C.S." Vol. 90 (1968), pp. 5,926–5,927.

Primary Examiner—Donald G. Daus
Assistant Examiner—James H. Turnipseed
Attorney, Agent, or Firm—William B. Walker

[57] ABSTRACT
Preparation of $\alpha,\beta$-unsaturated carbocyclic ketones by reacting a methylene phosphonium ylid or a monosubstituted methylene phosphonium ylid with an enol lactone.

31 Claims, No Drawings

PRODUCTION OF UNSATURATED CARBOCYCLIC KETONES

This is a division of application Ser. No. 773,356 filed Nov. 4, 1968, now Pat. No. 3,658,847, which is in turn a continuation-in-part of application Ser. No. 747,466, filed July 25, 1968 and now abandoned and application Ser. No. 687,477, filed Dec. 4, 1967, now Pat. No. 3,524,886.

The present invention relates to the production of unsaturated carbocyclic ketones.

More particularly, this inventioon relates to a novel process which has general utility for the conversion of enol lactones into $\alpha,\beta$-unsaturated carbocyclic ketones.

The expression "enol lactone," as used herein, refers to an unsaturated lactone having $\alpha,\beta$-ethylenic unsaturation in respect to the heterocyclic oxygen atom. The expression "$\alpha,\beta$-unsaturated carbocyclic ketone," as used herein, refers to a carbocyclic ketone having a $\alpha,\beta$-ethylenic unsaturation in respect to the keto group.

Prior to the present invention, enol lactones were converted into $\alpha,\beta$-unsaturated carbocyclic ketones by a two-step process which involved reacting the enol lactone with about one equivalent of a Grignard reagent, for example, methylmagnesium chloride, to open the lactone ring and thereafter the thus-obtained diketonic intermediate product was cyclized by treatment with acid or alkali to obtain the carbocyclic ketone. See, for example, U.S. Pat. Nos. 3,057,907 and 3,321,489 and French Pat. No. 1,359,675. In addition to the disadvantage that the conversion of enol lactones into carbocyclic ketones requires at least two steps, prior methods are often difficult to control, unsuitable for 5-membered ring systems, and of very narrow utility in that the $\alpha,\beta$-unsaturated carbocyclic ketones obtainable are very limited.

A primary object of the present invention, therefore, is to provide a process for the production of $\alpha,\beta$-unsaturated carbocyclic ketones from enol lactones which overcomes the aforementioned disadvantages. Another object of the present invention is to provide a process for the production of $\alpha,\beta$-unsaturated carbocyclic ketones which is economical and simple to operate but yet of great flexibility or adaptability in respect to the type of $\alpha,\beta$-unsaturated carbocyclic ketone that can be produced. Another object of this invention is to provide a single-step process for the production of $\alpha,\beta$-unsaturated carbocyclic ketones. Still another object of the present invention is to provide a process for the production of $\alpha,\beta$-unsaturated carbocyclic ketones which is useful in the total synthesis of steroids and to novel intermediates thereof. Other objects, advantages and meritorious features of the present invention will become apparent as the invention is described in more detail hereinafter.

In accordance with the foregoing objects of the present invention, there has been discovered a very versatile process for the production of $\alpha,\beta$-unsaturated carbocyclic ketones which comprises reacting, under substantially anhydrous conditions in an organic solvent inert to the reaction, an enol lactone with a phosphonium ylid selected from the group consisting of methylenephosphonium ylids and mono-substituted methylenephosphonium ylids.

The process of the present invention is applicable to the conversion of enol lactones into $\alpha,\beta$-unsaturated carbocyclic ketones in general. The enol lactone can be either a monocyclic enol lactone or a polycyclic compound such as bicyclic, tricyclic, and tetracyclic enol lactones depending upon the $\alpha,\beta$-unsaturated carbocyclic ketone desired to be obtained. The process of the present invention is particularly suitable for enol lactone starting materials wherein the heterocyclic ring thereof contains at least 5 members and monoethylenic unsaturation. The enol lactones which can be converted into $\alpha,\beta$-unsaturated carbocyclic ketones by the process of this invention are too numerous to list. Exemplary of the monocyclic and polycyclic enol lactones which can be used in the process of the present invention are $\alpha,\alpha,\gamma$-trimethylbut-2-enolide, $\Delta^4$-valeryl lactone, isocoumarin, 3-methyl-6,8-dimethoxyisocoumarin, 3-phenylisocoumarin, 3-benzoyl-7,8-dimethoxyisocoumarin, 3-chloroisocoumarin, benzal phthalide, 5,6,7-trimethoxyisocoumarin, $\delta$-lactone of 1$\beta$-hydroxy-2$\beta$-methyl-2$\alpha$-(2'-carboxyethyl)-3-hydroxycyclopent-3-ene, $\delta$-lactone of 1$\beta$-hydroxy-4-(2'-carboxyethyl)-5-hydroxy-7a$\beta$-methyl-3a$\alpha$,4$\beta$,7,7a-tetrahydroindane, 4-oxa-17$\beta$-acetoxyandrost-5-en-3-one, 3-ethoxy-17-oxa-D-homoestra-1,3,5(10), 15-tetraen-17-one, 4-oxacholest-5-en-3-one, 17,20;20,21-bis-methylenedioxy-4-oxa-11$\beta$-hydroxypregn-5-en-3-one, and 3-methoxy-16-oxaestra-1,3,5(10),8,14-pentaen-17-one.

The phosphonium ylids which are useful in the production of $\alpha,\beta$-unsaturated carbocyyclic ketones in accordance with the process of the present invention are the methylene phosphonium ylids and the mono-substituted methylene phosphonium ylids. Methylene phosphonium ylids and mono-substituted methylene phosphonium ylids useful in the present invention are illustrated by the following formulas A and B, respectively:

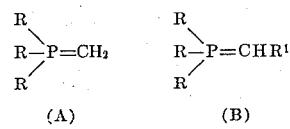

wherein each R is independently selected from the groups consisting of substituted and unsubstituted, saturated and unsaturated, aliphatic, carbocyclic and carbocyclic-aliphatic radicals and lower alkoxy radicals and $R^1$ is selected from the group consisting of substituted and unsubstituted, saturated and unsaturated, aliphatic, carbocyclic and carbocyclic-aliphatic radicals.

The phosphonium ylids of formulas A and B can also be illustrated as follows:

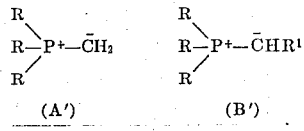

wherein, R and $R^1$ are as defined above.

Phosphonium ylids of formulas A and B above can be prepared, for example, by the reaction of a tri-substituted phosphonium halide, e.g. the bromide or chloride, with a reagent, e.g., a base, capable of removing hydrogen halide. Tri-substituted phosphonium halides can be prepared by known methods, such as by reacting a tertiary phosphine with an organic halide or a halogen acid. Suitable reagents which can remove hydrogen halide are organo metallic compounds, such as alkyl and aryl lithium, alkyl and aryl magnesium halides, alkali metal acetylides, alkali metal amides or alkali metal or alkaline earth alcoholates. The formation of the ylid can be carried out in inert solvents such as ether, tetrahydrofuran or dioxane and preferably in an oxygen-free atmosphere. The method for preparing the phosphonium ylid is not part of the present invention. Suitable procedures for the formation of and examples of methylene phosphonium ylids and mono-substituted methylene phosphonium ylids useful in the present invention are described by A. W. Johnson, "Ylid Chemistry," Academic Press Inc., New York (1966); S. Trippett, *Quarterly Reviews* 16, pp. 406-440 (1962); S. Trippett, *Advances in Organic Chemistry*, Vol. I, InterScience, New York, pp. 83-102 (1960); and A. Maercker, "Organic Reactions," Vol. 14, John Wiley & Sons, New York, pp. 270-490 (1965) and in U.S. Pat. Nos. 2,905,717; 2,917;523; 2,917,524; 2,950,321; 2,957,933; 3,078,256; 3,130,219; 3,152,152; and 3,347,932.

Methylene phosphonium ylids and mono-substituted methylenephosphonium ylids are sometimes unstable compounds which react easily with oxygen and decompose on standing for any appreciable period of time. Thus, in the practice of the process of the present invention, it is preferable to use a tricarbocyclic phosphonium ylid such as saturated tricarbocyclics, e.g., tricyclohexyl, and unsaturated tricarbocyclics (i.e., trimonoaryls) such as triphenyl, tritolyl, trianisyl, trichlorophenyl, and the like, or tri(carbocyclic-aliphatic) phosphonium ylids such as tribenzyl, and the like, and not to isolate the phosphonium ylid but rather to react it with the enol lactone in situ.

While the methylene phosphonium ylids and mono-substituted methylene phosphonium ylids which can be employed in the process of the present invention are too numerous to list here, they can be exemplified by the following:

methylenetrimethylphosphorane,
methylenetricyclohexylphosphorane,
methylenetriphenylphosphorane,
methylenetri-N-piperidylphosphorane,
methylenetri-N-morpholinophosphorane,
methylenetri-(p-tolyl)phosphorane,
methylenetri-(p-anisyl)phosphorane,
methylenetri-(n-butyl)phosphorane,
methylenediallylmethylphosphorane,
methylenediphenylethylphosphorane,
methylenedimethylphenylphosphorane,
methylenedimethyl p-methoxyphenylphosphorane,
methylenediallylphenylphosphorane,
methylenetribenzylphosphorane,
methylenediphenyltolylphosphorane,
methylmethylenetriphenylphosphorane, (ethylidenetriphenylphosphorane),
3-cycloethylenedioxybutylmethylenetriphenylphosphorane,
3,3-dimethoxypropylmethylenetriphenylphosphorane,
ethylmethylenetriphenylphosphorane,
n-propylmethylenetriphenylphosphorane, and the like.

In practicing the conversion of an enol lactone into the corresponding $\alpha,\beta$-unsaturated carbocyclic ketone in accordance with the process of the present invention, the reaction is carried out using about equal molar amounts of the phosphonium ylid and enol lactone. More than one molar equivalent of the phosphonium ylid can be used but it is generally disadvantageous to do so because in some cases the excess reagent may react further with the carbonyl group of the desired carbocylic ketone. Thus, it is preferred to use about one molar equivalent of the phosphonium ylid or a modest excess such as up to about 1.2 molar equivalents. Any organic solvent can be used for the reaction medium so long as it is inert to the reaction and reagents. Suitable organic solvents are set forth in the references listed hereinabove and include hydrocarbons such as benzene, toluene, and the like; ethers such as tetrahydrofuran, dioxane, monoglyme, diglyme, and the like; dialkylsulfoxides such as dimethylsulfoxide, and the like; and mixtures thereof. When the phosphonium ylid is prepared in situ, the enol lactone can be introduced as a solution using the same solvent as that used for the preparation of the ylid. The reaction generally goes to completion in from about 0.5 hours to about 48 hours depending upon such factors as temperature and the relative reactivity of the ylid and enol lactone. The reaction temperature can vary from about $-40°C$ to the reflux temperature of the reaction mixture depending upon such factors as the stability of the ylid, the relative reactivity of the ylid and enol lactone being reacted and the time in which it is desired to complete the reaction. In the case of the more stable ylids derived from, for example, triarylphosphonium halides, such as methylenetriphenylphosphorane, it is best to employ reaction temperatures of about room temperature to elevated temperatures, such as the reflux temperature of the reaction mixture, in order to complete the reaction within a shorter period of time.

There is formed an intermediate ylid which in some cases can be isolated, if desired, or the reaction continued without interruption to form the $\alpha,\beta$-unsaturated carbocyclic ketone. As shown more fully hereinafter, whether an intermediate ylid is formed that can be isolated is dependent upon the reactivity of the particular phosphonium ylid and enol lactone being reacted, the solvent medium and the reaction temperature. If it is desired to isolate the intermediate phosphonium ylid, the enol lactone and phosphonium ylid A or B are preferably mixed together at room temperature or below, preferably about 0° to 15°C. If it is desired not to isolate the intermediate ylid, the reaction can be continued without interruption or it can be continued more efficiently by the addition of a lower monohydric aliphatic alcohol, such as methanol, ethanol, isopropanol t-butanol, and the like, with or without the addition of a base such as an alkali metal alkoxide or hydroxide, such as sodium methoxide, sodium ethoxide, sodium hydroxide, potassium hydroxide, potassium methoxide, sodium t-butoxide, and the like. The lower alcohol or an alcohol containing a base should be added after the enol lactone and phosphonium ylid have been commingled or preferably after the disappearance of the initial phosphonium ylid which can be followed by thin layer chromatography. A part of all of the original solvent can first be removed, if desired, and the alcohol, with or without base, added thereafter. The amount of lower alcohol added should generally be such as to provide at least about 10 percent by volume of the total amount of solvent in the reaction mixture, preferably from about 25 to 80 percent. The amount of base included in the alcohol is not critical, a small amount generally being sufficient. The most advantageous amount of base is easily determinable by routine experimentation giving consideration to the enol lactone, phosphonium ylid and solvent being employed. In the case of solvents such as diglyme, monoglyme, dialkylsulfoxide, and the like, if it is not desired to isolate the ylid intermediate, it has been found to be advantageous to include or add after commingling of the enol lactone and ylid from about 10 to 75 percent, preferably 25 to 50 percent, by volume of the total solvent of a dipolar aprotic solvent, such as hexamethylphosphoramide, dimethylformamide, dimethylacetamide, and the like. A particularly preferred reaction solvent is diglyme in that the process is very efficient in terms of time and yield. In the foregoing methods, when it is not desired to isolate the ylid, the efficiency of the reaction is generally increasd by increasing the reaction temperature to above room temperature, such as reflux temperature.

For optimum results, it is important that the reaction be conducted under as near anhydrous conditions as possible and preferably under an inert oxygen-free atmosphere such as nitrogen, argon, and the like. While the concentration of the enol lactone and ylid does not appear to be critical, it is preferred to operate at low concentrations of the order of about 2 to about 25 percent by weight of the reaction medium. The foregoing reaction conditions are largely dependent upon the particular phosphonium ylid and enol lactone employed and are presented as a guide. Provided with the foregoing and the examples hereinafter, the most advantageous or optimum conditions and proportions of the enol lactone and phosphonium ylid for a particular $\alpha,\beta$-unsaturated carbocyclic ketone are easily determinable by one of ordinary skill in the art using routine experimentation.

In the case of enol lactone starting materials having other carbonyl groups present, e.g., an isolated keto group, it is preferable to introduce a protecting group prior to the reaction. An isolated keto group can be protected as through formation of the corresponding lower alkylenedioxy or ketal, such as ethylenedioxy, propylenedioxy, and the like, using an alkylene glycol in the presence of acid and the keto group regenerated by treatment with acid following formation of the $\alpha,\beta$-unsaturated carbocyclic ketone. Alternatively, an isolated keto group can be reduced to the free hydroxyl by the use of reducing agents, such as lithium aluminum hydride, lithium tri(t-butoxy)aluminum hydride or sodium borohydride, and subsequently oxidized using, e.g., chromium trioxide or Jones reagent following completion of the reaction. If a free hydroxyl group is present, there may be some reaction of the hydroxy group with the ylid reagent to form the corresponding alkoxide and hence require that an excess of the ylid be used. It is preferred to protect hydroxyl groups by esterification to a carboxylic ester, such as acetate, benzoate, cyclopentylpropionate, mesitoate, and the like, or by etherification. Since the ester group in some cases will react with the ylid to some extent, it is preferred to convert free hydroxyls of the starting material into an acid labile ether group such as tetrahydropyran-2-yloxy, tetrahydrofuran-2-yloxy, methoxy, ethoxy, t-butoxy, or methoxymethylenoxy and especially t-butoxy. In general, however, the phosphonium ylid tends to react faster with the enol lactone groups.

Depending upon the particular enol lactone starting material, there is formed in some cases $\beta,\gamma$-carbocyclic ketone along with the $\alpha,\beta$-unsaturated carbocyclic ketone.

The term "lower alkyl," as used herein, refers to a saturated aliphatic hydrocarbon group, branched or straight chain, containing one to six carbon atoms. The term "monoaryl" refers to phenyl and substituted phenyl, such as tolyl, chlorophenyl, methoxyphenyl, and the like. Carboxylic acyl and carboxylic acyloxy refer to an acyl group and acyloxy group, respectively, containing less than 12 carbon atoms. Typical ester groups thus include acetate, propionate, butyrate, benzoate, mesitoate, cyclopentylpropionate, enanthate, trimethylacetate, t-butylacetate, adamantoate, and the like.

The novel process of the present invention is particularly useful for the production of carbocyclic ketones admirably suited for the synthesis of steroids. One application of the process of the present invention is illustrated below in a novel route for the synthesis of 19-nor steroids wherein R' is t-butyl and R⁴ is lower alkyl.

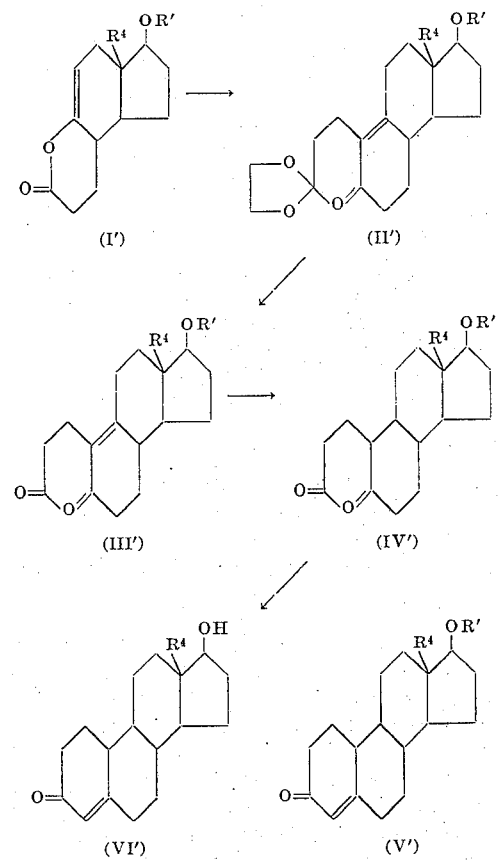

In the practice of the above process, the novel tricarbocyclic enol lactone (I') is reacted with a 3-cycloethylenedioxybutylmethylene substituted phosphorane of the following formula:

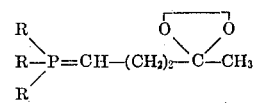

in which R is as defined above to yield the $\alpha,\beta$-unsaturated tricarbocyclic ketone (II') in which R' and R⁴ are as defined above. The $\alpha,\beta$-unsaturated ketone (II') is treated with aqueous organic acid such as acetic acid to yield the dione (III'). The dione (III') is subjected to catalytic hydrogenation using, e.g., palladium-on-carbon or barium sulfate to yield the saturated dione (IV'). The saturated dione is cyclized using either acid to afford 19-nortestosterone (IV') or using base to yield the t-butyl ether of 19-nortestosterone (V'). Cyclization with acid is accomplished with a mineral acid such as sulfuric acid or hydrochloric acid with concomitant removal of the t-butyl group. Suitable bases for cyclization include the alkali hydroxides such as sodium hydroxide. The 19-nor steroids of formulas V' and VI' are useful anabolic agents and intermediates for preparing other useful steroids such as 17α-ethynyl-17β-hydroxyester-4-en-3-one (U.S. Pat. No. 2,744,122) by oxidation followed by ethynylation.

The following examples are provided to illustrated the present invention. Temperature in degrees centigrade.

EXAMPLE 1

A. To a solution of 5 g. of methylenetriphenylphosphorane in 100 ml. of dry tetrahydrofuran under nitrogen, there is added one molar equivalent of 3-methoxy-16-oxaestra-1,3,5(10), 8,14-pentaen-17-one in dry tetrahydofuran. The mixture is allowed to stand at room temperature for 18 hours and is then filtered. The filtrate is diluted with water and then extracted with ether. The ether extracts are combined and concentrated to furnish a residue which is chromatographed on neutral alumina eluting with benzene to afford 3-methoxy-14β-estra-1,3,5(10),8,15-pentaen-17-one and 3-methoxyestra-1,3,5(10),8,14-pentaen-17-one which can be further purified by recrystallization from aqueous methanol.

B. 0.5 Grams of 3-methoxyestra-1,3,5(10),8,14-pentaen-17-one in 25 ml. of ethanol is reduced catalytically with 50 mg. of 5 percent palladium-on-charcoal until a molar equivalent of hydrogen is taken up. The catalyst is filtered off and the filtrate evaporated to dryness to yield 3-methoxyestra-1,3,5(10),8-tetraen-17-one which can be converted into estrone methyl ether by procedures outlined in *Chemistry & Industry* (London), 1,022 (1960) or into 19-nor-$\Delta^4$ steroids using the procedure of, for example, U.S. Pat. No. 3,318,922.

The process of Example 1A is repeated using other tetracyclic enol lactones of formula I as the stirring material to yield α,β-unsaturated tetracarbocylic ketones.

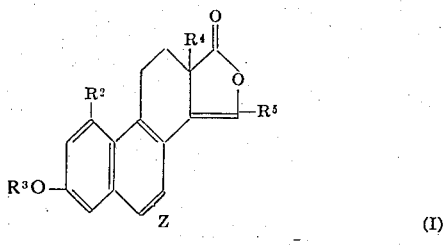

(I)

In the above formula, $R^2$ is hydrogen or lower alkoxy of one to six carbon atoms; $R^3$ is lower alkyl; $R^4$ is lower alkyl; $R^5$ is hydrogen or methyl and Z is a carbon-carbon single bond or double bond between C—6 and C—7.

Thus, 3-methoxy-15-methyl-16-oxaestra-1,3,5(10),6,8,14-hexaen-17-one (I; $R^2$ is hydrogen, each of $R^3$, $R^4$ and $R^5$ is methyl; and Z is a double bond) is used in Example 1A to afford 3-methoxy-15-methyl-14β-estra-1,3,5(10), 6,8,15-hexaen-17-one.

the tetracyclic enol lactones can be prepared according to the method of Simpson, et al., *Tetrahedron Letters*, 3,209, (1967) or U.S. Pat. No. 3,309,383.

By use of the procedure of Example 1B, the α,β-unsaturated tetracarbocyclic ketones obtained from the enol lactones (I) can be converted into aromatic A steroids and 19-nor-$\Delta^4$ steroids.

EXAMPLE 2

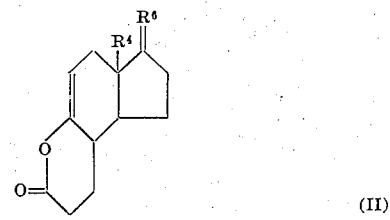

(II)

In the above formula, $R^4$ is lower alkyl and $R^6$ is oxo or lower alkylenedioxy thereof or the group

in which $R^7$ is hydroxy or carboxylic ester thereof or labile ether thereof.

To a solution of 3 g. of methylenetriphenylphosphorane in 60 ml. of dry tetrahydrofuran under nitrogen, there is added one molar equivalent of the tricyclic enol lactone of formula II in which $R^4$ is methyl and $R^6$ is the group

in which $R^7$ is benzoyloxy in dry tetrahydrofuran. The mixture is heated at reflux for about 3 hours and then allowed to cool to room temperature. The reaction mixture is filtered and the filtrate diluted with water and then extracted with ether. The ether extracts are combined and concentrated under reduced pressure. The residue is chromatographed to afford the compound of formula III in which Bz is benzoyl (17β-benzoyloxy-des-A-estr-9-en-5-one) which can be used to prepare therapeutically useful 19-nor or $\Delta^{1,3,5(10)}$ steroids according to the prodecure of U.S. Pat. No. 3,150,152.

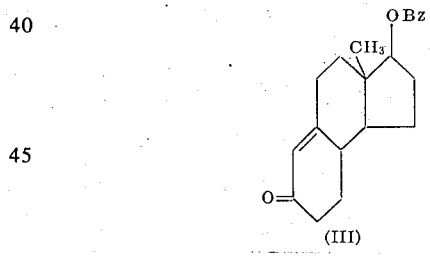

(III)

The process of Example 2 is repeated with the exception of using methylmethylenetriphenylphosphorane as the Wittig reagent and there is obtained the α,β-unsaturated tricarbocyclic ketone (IV) which can be used in the synthesis of $\Delta^4$-androstenes using the procedure of U.S. Pat. No. 3,115,507, or Velluz, et al., *Tetrahedron* Suppl. 8, Part II, pp. 495–505 (1966).

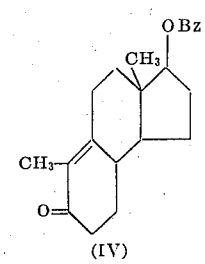

(IV)

To a solution of 6 g. of 3-cycloethylenedioxybutylmethylenetriphenylphosphorane in 100 ml. of dry tetrahydrofuran under nitrogen, there is added 1.1 molar equivalents of the tricyclic enol lactone of formula II (R⁴ is methyl; R⁶ is

in which R⁷ is benzoyloxy) in tetrahydrofuran. The mixture is heated at reflux for about 2 hours and then allowed to cool to about room temperature. The reaction mixture is concentrated to about 25 ml. and to the concentrate is added 100 ml. of methanol containing 2 g. of KOH. The mixture is heated at reflux for about 2 hours. The reaction mixture is then poured into water and the resulting mixture extracted with ether. The ether extracts are combined, washed with water, dried over sodium sulfate and concentrated under reduced pressure. The residue is chromatographed to afford the α,β-unsaturated tricarbocyclic ketone of formula V.

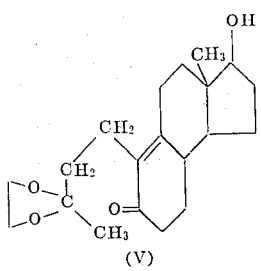

The α,β-unsaturated tricarbocyclic ketone of formula V is useful intermediate for the preparation of 19-nor steroids using the procedure of, for exampmle, French Pat. Nos. 1,369,946 (1964) 1,432,570 (1964); 1,452,898 (1965); or Velluz, et al., ibid.

The phosphonium ylid employed in this example can be prepared according to the procedure of Maercker, ibid., or by the following method.

A solution of 20.9 g. of the ethylene ketal of methyl 3-bromopropyl ketone (obtained by treating the ketone with ethylene glycol in benzene in the presence of p-toluenesulfonic acid) in 100 ml. of benzene is treated with 20 g. of triphenylphosphine. This mixture is heated at reflux for 2 hours and then filtered. The solid material thus collected is washed with benzene, dried in vauco, and added to 6.5 g. of butyl lithium in 50 ml. of dimethylsulfoxide. This mixture is stirred until a red solution is obtained indicating completion of the ylid formation. The progress of the reaction can be followd by means of the Gilman test which is positive so long as unconsumed butyl lithium is present.

EXAMPLE 4

To a suspension of 4 g. of (4-chloropent-3-enyl)triphenylphosphonium bromide (VI) in 50 ml. of dry diglyme, there is added 1.1 equivalents of butyl lithium in hexane with stirring, under nitrogen. This mixture is stirred for about 25 minutes and then 1.1 equivalents of the tricyclic enol lactone (II; R⁴ is methyl and R⁶ is

in which R⁷ is benzoyloxy) in 60 ml. of dry diglyme is added. The reaction mixture is allowed to stand at room temperature for about 2 hours, 30 ml. of hexamethylphoramide is added, and the mixture is then heated at reflux for about 3 hours. After cooling, the reaction mixture is diluted with water and then extracted with ether. The ether extracts are combined, washed, dried over magnesium sulfate and evaporated under reduced pressure to afford the α,β-unsaturated tricarbocyclic ketone (VII; R⁷ is benzoyloxy), which can be purified further by chromatography on alumina.

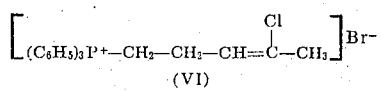

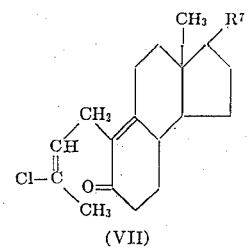

This procecure is repeated using the tricyclic enol lactone (II) (R⁴ is methyl and R⁶ is

in which R⁷ is t-butoxy) to yield VII (R⁷ is t-butoxy).

The tricarbocyclic ketone (VII) is a useful intermediate for the synthesis of aromatic A steroids using the procedure of U.S. Pat. Nos. 3,050,550 and 3,150,152.

The phosphonium bromide (VI) can be prepared according to the following procedure.

A mixture of 10 g. of 1-bromopentan-4-one, 100 ml. of carbon tetrachloride and 5 g. of phosphorus pentachloride, is refluxed for 10 hours. The reaction mixture is then cooled, washed with dilute sodium carbonate and water, dried over magnesium sulfate and evaporated to give 1-bromo-4-chloropent-3-ene which is purified by distillation and converted into the phosphonium bromide (VI) by treatment with triphenylphosphine in benzene.

EXAMPLE 5

To a suspension of 4 g. of 3-(tetrahydropyran-2'-yloxy)-butylmethylenetriphenylphosphorane in 50 ml. of monoglyme, there is added 1.1 equivalents of butyl lithium in hexane with stirring under nitrogen. This mixture is stirred for about 25 minutes and then 1.1 equivalents of the tricyclic enol lactone (II; R⁴ is methyl and R⁶ is R⁷ wherein R⁷ is t-butoxy) in 60 ml. of dry monoglyme is added. The reaction mixture is allowed to stand at room temperature for about 3 hours and then is concentrated under reduced pressure to about 40 ml. To the concentrate, there is added 100 ml. of methanol containing 2 g. of sodium methoxide. The mixture is heated at reflux for about 4 hours. After cooling, the reaction mixture is diluted with water and then extracted with ether. The ether extracts are combined, washed, dried over magnesium sulfate and evaporated under reduced pressure to afford the tricarbocyclic ketone (VIII) which can be converted into 19-nor steroids using the procedures referenced in Example 3.

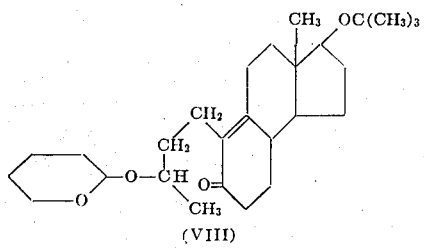
(VIII)

The compound of formula VIII is subjected to hydrolysis using acetic acid followed by oxidation which chromium trioxide in pyridine to afford the compound VIII'.

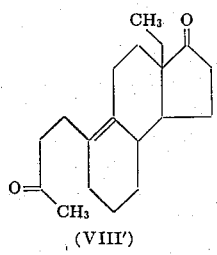
(VIII')

A mixture of 10 g. of 1-chloropentan-4-one, 100 ml. of ether and 1 g. of lithium aluminum hydride is allowed to stand at 20°C for 20 hours. The reaction mixture is diluted with water and separated. The organic phase is washed with water, dried and evaporated to give 1-chloropentan-4-ol which is purified by distillation. Two ml. of dihydropyran is added to a solution of 1 g. of 1-chloropentan-4-ol in 15 ml. of benzene. About 1 ml. is removed by distillation to remove moisture and 0.4 g. of p-toluene-sulfonic acid is added to the cooled solution. This mixture is allowed to stand at room temperature for four days and is then washed with aqueous sodium carbonate solution and water, dried and evaporated to yield 4-(tetrahydropyran-2'-yloxy)-1-chloropentane which is treated with triphenylphosphine in benzene to furnish 4-(tetrahydropyran-2'-yloxy)pentyltriphenylphosphonium chloride. This phosphonium chloride is then treated with butyl lithium in dry monoglyme to afford the ylid.

EXAMPLE 6

The process of Example 5 is repeated with the exception that the ylid employed is an ylid of formula IX and there is obtained the tricarbocyclic ketone (X) which is useful in the synthesis of 2-methyl-19-nor steroids using the procedure of, for example, Velluz et al., ibid.

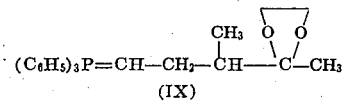
(IX)

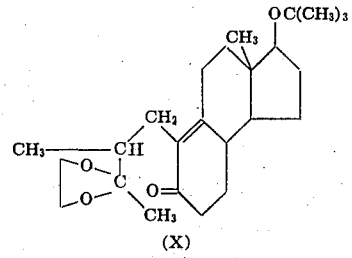
(X)

The phosphonium ylid (IX) can be prepared as follows.

A mixture of 0.5 moles of 1-acetoxypentan-4-one and 0.5 moles of piperidine in benzene is refluxed using a water separator until no more water distills from the reaction mixture. The reaction mixture is then cooled, washed and dried to afford the 1-acetoxypent-3-one (XI). A mixture of 5 g. of XI in 100 ml. of dioxane is treated with an excess of methyl iodide at 20°C for 18 hours and then heated at 70°C for 6 hours. The reaction mixture is concentrated to a small volume, diluted with water and 1-acetoxy-3-methylpentan-4-one isolated by extraction with ethyl acetate. A mixture of 0.5 g. of this ketone, 100 mg. of p-toluenesulfonic acid, 3 ml. of ethylene glycol and 100 ml. of benzene is refluxed using a water separator for 24 hours. The reaction mixture is cooled and then 100 ml. of ethanol and 2 g. of potassium hydroxide are added.

This mixture is refluxed for 6 hours, cooled, diluted with water and the corresponding ethylene ketal is isolated by extraction with ethyl acetate. A solution of 0.1 moles of the ketal in 50 ml. of dimethylformamide containing 0.1 moles of triphenylphosphine is reacted with 0.1 moles of carbon tetrabromide at room temperature for 18 hours. The mixture is diluted with water and extracted with ether. The ether extracts are combined, dried and evaporated. The residue is chromatographed on 400 g. of alumina eluting with hexane-benzene and benzene to give the ethylene ketal of 1-bromo-3-methylpentan-4-one which is treated with triphenylphosphine in toluene to afford 4,4-ethylenedioxy-3-methylpentyltriphenyl phosphonium bromide which upon treatment with butyl lithium in monoglyme furnishes the ylid (IX).

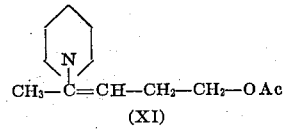
(XI)

EXAMPLE 7

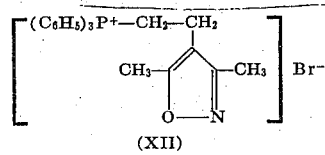
(XII)

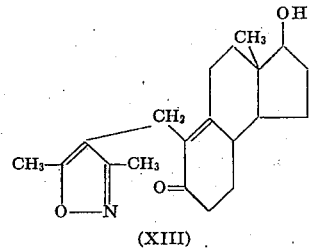
(XIII)

The mono-substituted methylenetriphenylphosphonium bromide (XII) (4 g.) in 75 ml. of ether is treated with 1 equivalent of butyl lithium in ether under nitrogen at −20°C. After about 15 minutes, 1.1 equivalents of the tricyclic enol lactone (II; R$^4$ is methyl; R$^6$ is

R'
|...H in which R⁷ is benzoyloxy in ether is added and the reaction mixture allowed to warm to room temperature. To the mixture is added 50 ml. of methanol containing 1 g. of aqueous KOH and the resulting mixture is heated at reflux for 3 hours. The reaction mixture is then diluted with water and then extracted with ether. The ether extracts are combined, washed with water, dried and evaporated under reduced pressure. The residue is purified by chromatography on alumina to give the tricarbocyclic ketone (XIII).

The phosphonium bromide (XII) can be obtained according to the following outlined procedure.

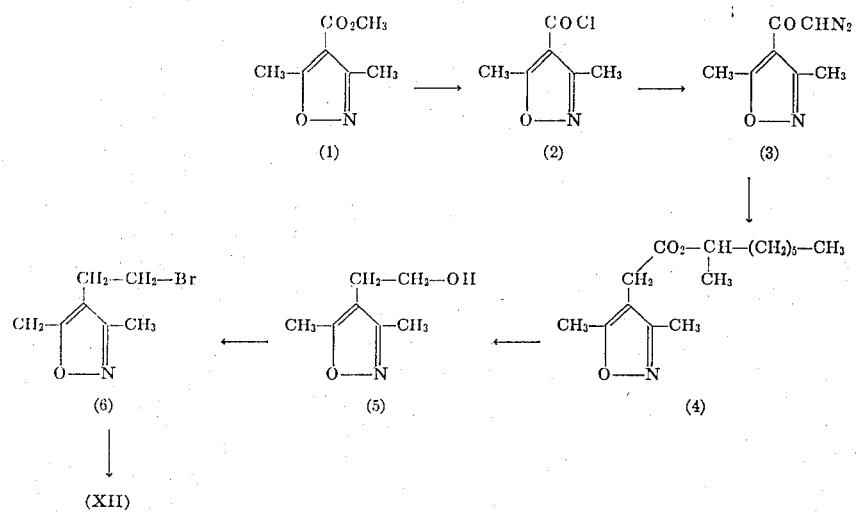

Ten grams of the isoxazole (1) is heated at reflux with 200 ml. of 1 percent sodium hydroxide in methanol for 5 hours. The reaction is then acidified at pH 3 with HCl and the acidified mixture is then concentrated to a small volume under reduced pressure. Water is added and the acid isolated by extraction with ethyl acetate. The crude acid (9 g.) is taken up in methanol and treated with 1 equivalent of sodium methoxide. The alcohol is evaporated and the residue dried under reduced pressure. The residue is then suspended in dry benzene and treated at 0°C with an excess of oxalyl chloride. After the evolution of gas ceases, the reaction mixture is allowed to warm to room temperature and the excess of oxalyl chloride removed by evaporation of the solvent medium to dryness. The resulting acid chloride (2) is taken up in benzene and treated with an excess of ethereal diazomethane. After the formation of the diazoketone is complete, the ether is removed and the resulting diazoketone heated under reflux in octan-2-ol until nitrogen evolution ceases. The crude product is purified by distillation and reduced with an excess of lithium aluminum hydride in 200 ml. of tetrahydrofuran under reflux. The reaction mixture is decomposed by cautious addition of ethyl acetate and the inorganic salts precipitated by the addition of concentrated sodium sulfate solution. The solution is then filtered and evaporated to yield the alcohol (5) which is purified by distillation. The alcohol (5) is then treated with phosphorus tribromide in benzene to give the bromide (6) which is converted into the phosphonium salt (XII) by treatment with 1 equivalent of triphenylphosphine in benzene.

The tricarbocyclic ketone (XIII) is an excellent intermediate for the preparation of valuable 19-norandrostene or androstene steroids by methods in the *Journal of American Chemical Society* 82, No. 21, 5,464 (1967).

EXAMPLE 8

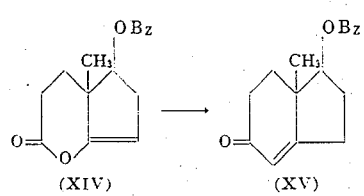

To a suspension of 1.5 g. of methyltriphenylphosphonium bromide in 50 ml. of dry tetrahydrofuran under nitrogen, there is added 1.2 equivalents of n-butyl lithium in hexane with stirring. The mixture is stirred for about 30 minutes and then 1.1 equivalents of the bicyclic enol lactone of formula XIV in 50 ml. of dry tetrahydrofuran is added and the resulting mixture heated at reflux for about 3 hours. After cooling to about room temperature, the reaction mixture is diluted with water and then extracted with ether. The ether extracts are then concentrated under reduced pressure to furnish the 5,6,7,8-tetrahydro-1β-benzoyloxy-8-methylindane-5-one of formula XV which can be purified by fractional distillation.

The α,β-unsaturated bicarbocyclic ketone of formula XV is a valuable intermemdiate for the synthesis of steroids using the method of, for example, Whitehurst, et al., U.S. Pat. No. 3,317,566.

Using the procedure of this example, bicyclic enol lactones of formula XVI can be converted into the corresponding α,β-unsaturated bicarbocyclic ketone.

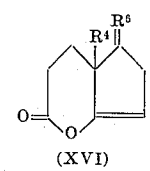

In the above formula, R⁴ and R⁶ are as defined hereinabove.

The procedure of this example is repeated with the exception that tetrahydrofuran is replaced by diglyme to which there is added 25 percent by volume of hexamethylphosphoramide to give the carboxylic ketone (XV).

The bicyclic enol lactones of formula XVI can be prepared according to the method of French Pat. No. 1,496,817 (1966) or using the following method.

A mixture of 0.3 g. of 2-methylcyclopentane-1,3-dione, 0.33 ml. of methylacrylate and 0.1 g. of potassium t-butoxide in 200 ml. of t-butanol is allowed to stand at about 20°C for 72 hours. The reaction mixture is washed with water, dilute sodium hydroxide and the water to neutral, dried and evaporated to give 2-methyl-2-(β-carbomethoxyethyl)cyclopentane-1,3-dione which is purified by distillation.

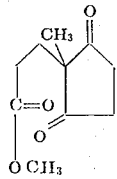
(XVII)

A mixture of 5 g. of the diketo ester (XVII), 100 ml. of tetrahydrofuran and 1.3 molar equivalents of lithium tri-t-butoxyaluminum hydride is heated at reflux until the hydride reagent is consumed. The reaction mixture is cooled, diluted with concentrated aqueous sodium sulfate solution and the resulting clear supernatant decanted and evaporated. The resulting residue is purified by chromatography on alumina to furnish 0.3 g. of the following alcohol

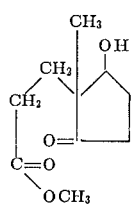

which is converted into the corresponding benzoate by treatment with benzoyl chloride in pyridine. The methyl ester is hydrolyzed to the acid which is then cyclized to furnish the enol lactone of formula XIV.

EXAMPLE 9

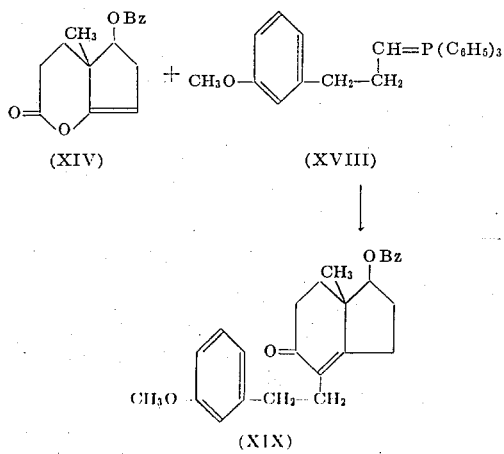

To 3 g. of the triphenylphosphonium ylid of formula IVIII in 50 ml. of dry monoglyme under nitrogen, there is added 1.1 molar equivalents of the enol lactone (XIV) in 75 ml. of dry monoglyme. The reaction mixture is allowed to stand for seven hours at room temperature, 150 ml. of diglyme and 50 ml. of hexamethylphosphoramide are added and then the mixture is heated at reflux for 20 hours. After cooling, water is added and the product isolated by extraction with chloroform and purified by chromatography on alumina to afford the indane-5-one of formula XIX, i.e., 5,6,7,8-tetrahydro-1β-benzoyloxy-4-[(2'-m-methoxyphenyl)ethyl]-8β-methylindan-5-one which is converted into 3-methoxyestra-1,3,5(10),8,14-pentaen-17β-ol 17-benzoate by treatment with p-toluenesulfonic acid in boiling benzene or according to the method of U.S. Pat. No. 3,317,566.

By repeating the process of this example with the exception that an equivalent amount of the ylid of formula XX below is used

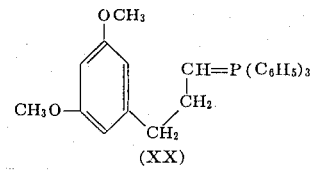
(XX)

in place of the ylid of formula XVIII and there is obtained the novel α,β-unsaturated bicarbocyclic ketone of formula XXI below.

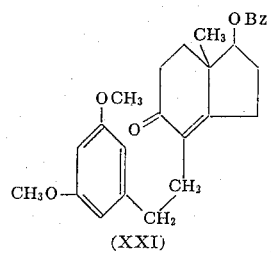
(XXI)

Othere bicyclic enol lactones of formula XVI can be used in the above process to yield the corresponding α,β-unsaturated bicarbocyclic ketones. For example:

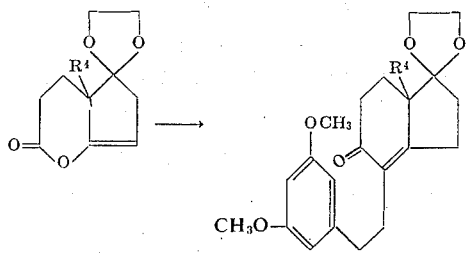

The mono-substituted methylene phosphonium ylids (XVII) and (XX) employed in this example can be prepared according to the following procedure.

Ten grams of m-methoxycinnamic acid in 100 ml. of ethanol is treated with 0.5 g. of pre-hydrogenated 10% palladium-on-charcoal until the uptake of hydrogen ceases. The catalyst is removed by filtration and the filtrate evaporated to yield 3-(m-methoxyphenyl)-propionic acid.

A solution of 5 g. of the foregoing propionic acid in 100 ml. of tetrahydrofuran is added cautiously to a boiling solution of 250 ml. of tetrahydrofuran containing 3 g. of lithium aluminum hydride. The reaction mixture is refluxed overnight with stirring and then cooled and the excess of hydride decomposed by the cautious addition of ethyl acetate and then saturated sodium sulfate. The resulting clear solution is decanted and dried over sodium sulfate. The solvent remaining is removed by distillation to give 3-)m-methoxyphenyl)propanol which is purified by distillation in vacuo. One gram of 3-(m-methoxyphenyl)propanol in 50 ml. of benzene is boiled with a slight excess of phosphorus tribromide until thin layer chromatography no longer indicates the presence of starting alcohol. The reaction mixture is cooled, washed with water and dilute sodium carbonate solution, dried over sodium sulfate and concentrated to dryness. The resulting crude 3-(m-methoxyphenyl)-propylbromide is purified by distillation and then converted into the phosphonium salt (XVIII') by reaction with triphenylphosphine in toluene.

By repeating the above procedure using 3,5-dimethoxycinnamic acid in place of m-methoxycinnamic acid, the corresponding salt (XX') is obtained.

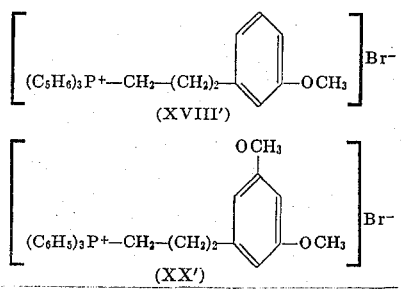

The above salts (XVIII') and (XX') are then converted into the phosphonium ylids of formulas XVIII and XX, respectively, by treatment with a reagent capable of removing hydrogen halide such as an organo metallic compound, e.g., butyl or phenyl lithium in an inert organic solvent such as those described hereinabove. The resulting phosphonium ylid can then be used in situ by adding the enol lactone to the ylid in the same or a different inert solvent as used in the formation of the ylid.

Similarly, by using phosphorus trichloride in the above procedure, the chloride salts corresponding to XVIII' and XX' are obtained. Also, by using other tri-substituted phosphines in place of triphenylphosphine, e.g., tricyclohexylphosphine, tritolylphosphine, diphenyltolylphosphine, trichlorophenylphosphine, and the like, the corresponding tri-substituted salts and ylids are obtained. By using other m-loweralkoxycinnamic acids and 3,5-di(lower alkoxy)cinnamic acids, the corresponding lower alkoxy and di(lower alkoxy) ylids are obtained.

By reacting the enol lactones of formula XVI with phosphonium ylids of formula XXI, the corresponding α,β-unsaturated carbocyclic ketones (XXII) are obtained.

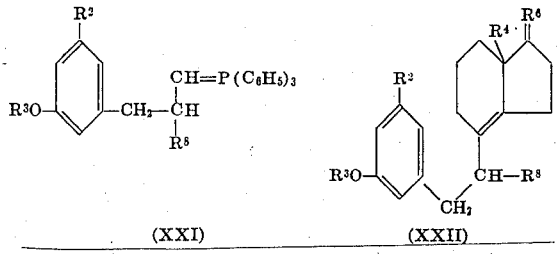

In the above formulas, $R^2$, $R^3$, $R^4$ and $R^6$ are as defined hereinabove and $R^8$ is hydrogen or methyl.

The ylids of formula XXI can be prepared according to the following outlined procedure wherein $R^2$, $R^3$ and $R^8$ are as defined above and x is chloro, bromo or iodo.

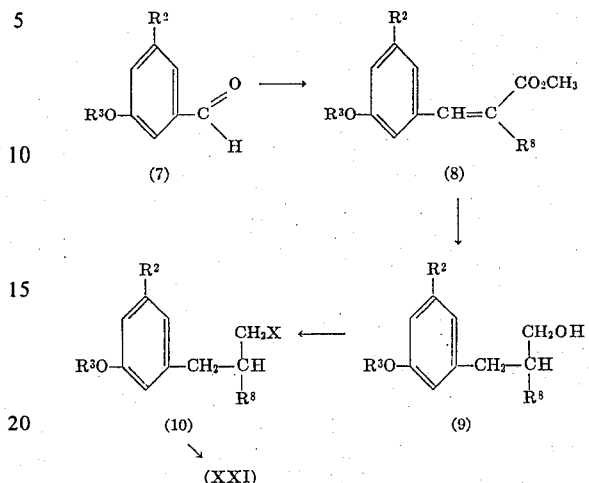

A solution of 0.6 moles of the aldehyde (7) and 0.5 moles of methyl α-bromopropionate in 80 ml. of dry benzene is added drop-wise to 0.6 moles of zinc dust. After 15 ml. of the solution is added, the mixture is heated to initiate the reaction. The remaining portion of the solution is then added during 1 hour. The resulting mixture is cooled, washed with water, dried and then refluxed with 0.2 g. of p-toluenesulfonic acid for 5 hours. After cooling, the reaction mixture is washed with dilute sodium bicarbonate solution and water and then dried and purified by distillation to give (8). One gram of (8) in 25 ml. of ethanol is hydrogenated with 0.1 g. of 5 percent palladium/carbon catalyst until 1 molar equivalent of gas is taken up. The catalyst is filtered off and the solvent evaporated to give 2-methyl-3-(substituted phenyl)propionic acid methyl ester. One gram of this ester in 100 ml. of tetrahydrofuran is reduced with 2 g. of lithium aluminum hydride until thin layer chromatography indicates the absence of starting ester. The reaction mixture is cooled, treated cautiously with an excess of ethyl acetate followed by saturated sodium sulfate solution. The organic layer is decanted off, dried with sodium sulfate and evaporated to give the alcohol (9) which is converted into the corresponding halide (10) by treatment with phosphorus pentachloride in benzene. The halide (10) is converted into the phosphonium salt (XXI') by reaction with triphenylphosphine. The salt on treatment with phenyl or butyl lithium affords the ylid (XXI).

Methyl bromo acetate can be used in place of methyl α-bromopropionate to obtain the ylid (XXI) in which $R^8$ is hydrogen.

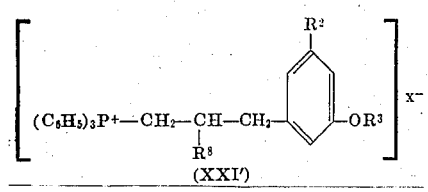

The carbocyclic ketones (XXII) in which $R^8$ is methyl are useful intermediates for the synthesis of 7-methyl substituted steriods following the cyclization procedure of U.S. Pat. No. 3,317,566.

EXAMPLE 10

To a suspension of 4 g. of 4,4-dimethoxybutylphosphonium bromide in 50 ml. of dry monoglyme under nitrogen, there is added 1.2 equivalents of phenyl lithium in hexane with stirring. This mixture is stirred for about 30 minutes and then 1.1 equivalents of the bicyclic enol lactone (XIV) in 50 ml. of dry monoglyme is added. The reaction mixture is heated at reflux for about 3 hours and then is allowed to cool to room temperature. The reaction mixture is then diluted with water and extracted with ether. The ether extracts are combined, washed, dried over magnesium sulfate and evaporated under reduced pressure. The residue is chromatographed on silica to afford the $\alpha,\beta$-unsaturated bicarbocyclic ketone (XXII).

The above procedure is repeated with the exceptions that monoglyme is replaced by diglyme containing 40 percent hexamethylphosphoramide, by volume, and the reaction mixture is refluxed for 6 hours to yield the bicarbocyclic ketone (XXII).

A mixture of 1 g. of the bicarbocyclic ketone (XXII), 25 ml. of methanol and 1 ml. of concentrated HCl is boiled 15 minutes. The reaction mixture is allowed to cool, poured into water and the resulting mixture separated. The organic phase is evaporated to dryness to furnish the aldehyde (XXIII) which is taken up in 20 ml. of acetone, cooled to 0°C and a slight molar excess of Jones reagent (prepared by mixing 26 g. of chromium trioxide with 23 ml. of concentrated sulfuric acid and diluting with water to 100 ml.) is added. Upon completion of the oxidation as followed by thin layer chromatography, the reaction mixture is diluted with water and then extracted with ethyl acetate. The ethyl acetate extracts are combined, washed with water, dried and evaporated under reduced pressure to afford the acid (XXIV) which is a valuable intermediate for the synthesis of known 19-nor-$\Delta^4$ and $-\Delta^{5(10)}$ steroids useful as therapeutic agents using the procedure of, for example, Belgium Pat. No. 629,251 (1963); French Pat. No. 1,465,400 (1965); Netherlands pat. No. 6,414,702; or Velluz, et al., ibid.

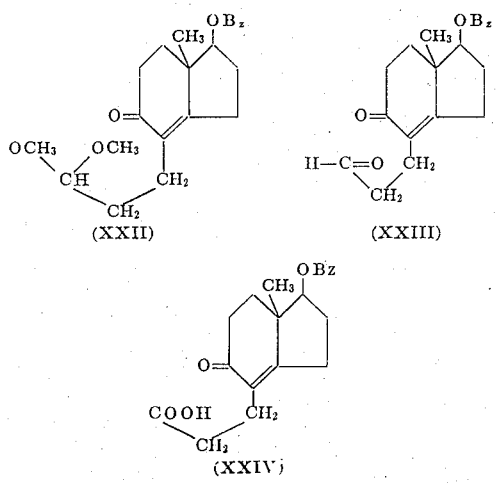

The 4,4-dimethoxybutyltriphenylphosphonium bromide employed in this example can be obtained according to the following procedure.

To 0.5 moles of diethylmalonate in 0.5 liters of dry benzene is added 0.5 moles of sodium hydride cautiously and the mixture stirred until hydrogen evolution ceases. Then 0.5 moles of bromoacetaldehydedimethylacetal [$(CH_3O)_2$—CH—$CH_2$—Br] in 100 ml. of benzene is added and the mixture stirred overnight followed by refluxing for 2 hours. The reaction mixture is cooled, washed with water and purified by vacuum distillation to give $\beta,\beta$-dimethoxyethylmalonic acid diethyl ester. A mixture of 5 g. of this ester in 100 ml. of ethanol containing 5 g. of sodium hydroxide is heated under reflux until evolution of carbon dioxide ceases. The reaction mixture is then saturated with carbon dioxide and evaporated to dryness under vacuum. The residue is suspended in 50 ml. of dry dimethylformamide to which is added a large excess of methyl iodide. The reaction mixture is stirred at room temperature for about 24 hours and then poured into water. The resulting mixture is extracted with ether and the ether extracts combined, washed with water and evaporated to give $\gamma$-dimethoxybutyric acid methyl ester which is purified by distillation. A mixture of 4 g. of this methyl ester, 50 ml. of dry tetrahydrofuran and 1.1 equivalents of lithium aluminum hydride is refluxed overnight. The reaction mixture is allowed to cool and then diluted with water. This mixture is extracted with ether and the ether extracts are combined, washed dried and evaporated to dryness to afford 4,4-dimethoxybutanol [$(CH_3O)_2$—CH—$CH_2$—$CH_2$—$CH_2$—OH].

A solution of 0.1 moles of 4,4-dimethoxybutanol in 50 ml. of dimethylformamide containing 0.1 moles of triphenylphosphine is allowed to react for 18 hours with 0.1 moles of carbon tetrabromide. The mixture is diluted with water and extracted with ether. The ether extracts are combined, washed with water, dried and evaporated to a crude product which is purified by distillation to yield 4,4-dimethoxybutylbromide. This bromide on treatment with triphenylphosphine in toluene furnishes 4,4-dimethoxybutyltriphenylphosphonium bromide.

By repeating this procedure using carbon tetrachloride in place of carbon tetrabromide, there is obtained 4,4-dimethoxybutyltriphenylphosphonium chloride.

Also, by using other tri-substituted phosphines in place of triphenylphosphine in the above procedure, e.g., tri(p-tolyl)-phosphine, trichlorophenylphosphine, diphenyltolylphosphine, the corresponding tri-substituted phosphonium bromide and chloride are obtained.

EXAMPLE 11

A suspension of n-butyltriphenylphosphonium bromide (1.94 g.) in 50 ml. of dry tetrahydrofuran is treated with 1.1 equivalents of butyl lithium in hexane under nitrogen. After 15 minutes, 1 g. of benzylidenephthalide in 10 ml. of tetrahydrofuran is added and the reaction mixture left overnight. The reaction mixture is then diluted with ethyl acetate, washed with water, dried, evaporated and chromatographed on alumina to give 3-benzyl-2-n-propylindenone. This reaction can be outlined as follows:

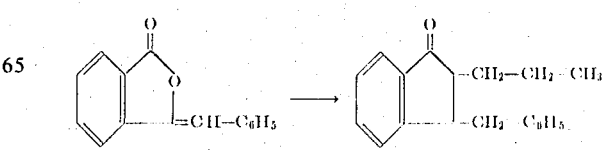

EXAMPLE 12

2.78 g. of Methyltriphenylphosphonium bromide is suspended in about 25 ml. of ether. Then 320 mg. of butyl lithium is added and the mixture stirred for about 15 minutes. Then 1 g. of benzylidenephthalide in about 10 ml. of tetrahydrofuran is added and the mixture stirred overnight at room temperature. The reaction mixture is diluted with water and then extracted with ether. The ether extracts are combined, washed with water, dried and the solvent removed under vacuum. The residue is chromatographed on silica eluting with methylene chloride:hexane (4:1) to afford 3-benzylidenindan-1-one and a small amount of starting material.

EXAMPLE 13

To a suspension of 600 mg. of methyltriphenylphosphonium bromide in 10 ml. of dry tetrahydrofuran under nitrogen, there is added 97 mg. of butyl lithium. Stirring is continued for about 20 minutes and then 374 mg. of 17$\beta$-acetoxy-4-oxaandrost-5-en-3-one in 10 ml. of dry tetrahydrofuran is added. The reaction mixture is then diluted with water followed by extraction with ether. The ether extracts are combined, dried over magnesium sulfate and evaporated to a residue which is purified by chromatography to yield 17$\beta$-acetoxyandrost-4-en-3-one.

The above procedure is repeated with the exception the reaction mixture is concentrated to a small volume to which is added 50 ml. of methanol containing 1 g. of aqueous KOH and the mixture is then refluxed 8 hours to yield 17$\beta$-hydroxyandrost-4-en-3-one.

By using methylmethylenetriphenylphosphorane as the ylid reagent in the process of this example, the corresponding methyl substituted tetracarbocyclic compound is obtained, i.e., 4-methyl-17$\beta$-acetoxyandrost-4-en-3-one.

By using other tetracyclic enol lactones in the above processes in place of 17$\beta$-acetoxy-4-oxaandrost-5-en-3-one as the starting material, e.g. 4-oxacholest-5-en-3-one, 3-ethoxy-17-oxa-D-homoestra-1,3,5(10),15-tetraen-17-one, and the like, the corresponding $\alpha,\beta$-unsaturated tetracarbocyclic ketone is obtained, e.g., cholest-4-en-3-one and 3-ethoxy-D-homoestra-1,3,5(10),14-pentaen-17-one.

EXAMPLE 14

To 4 g. of methylenetricyclohexylphosphorane in 50 ml. of dry tetrahydrofuran under nitrogen, there is added 1.1 molar equivalents of $\alpha,\alpha,\gamma$-trimethylbut-2-enolide in 50 ml. of dry tetrahydrofuran. The reaction mixture is allowed to stand at about 20°C for 8 hours and then diluted with water followed by extraction with ether. The ether extracts are combined, washed, dried over magnesium sulfate and evaporated under reduced pressure to afford 3,5,5-trimethylcyclohex-2-en-1-one which can be further purified, if desired, by chromatography.

EXAMPLE 15

To a solution of 5 g. of 3-cycloethylenedioxybutylmethylenetriphenylphosphorane in 100 ml. of dry tetrahydrofuran under nitrogen, there is added 1.1 molar equivalents of the enol lactone (I'; $R^4$ is methyl) in tetrahydrofuran. The mixture is heated at reflux for about 2 hours and then allowed to cool to about room temperature. The reaction mixture is concentrated to about 25 ml. and 100 ml. of methanol containing 2 g. of potassium hydroxide is added and the mixture refluxed under nitrogen for about 1.5 hours. The mixture is concentrated under vacuum, diluted with saturated aqueous sodium chloride and extracted with ether. The ether extracts are combined, washed, dried and evaporated to yield $\alpha,\beta$-unsaturated tricyclic ketone (II'). The ketone (II') in 50 ml. of 80 percent aqueous acetic acid is heated on a steam bath (solution temperature about 80°) for 1.5 hours. The mixture is concentrated under vacuum and isolation with ether affords the dione (III') with the t-butyl group (R') intact. The $\alpha,\beta$-unsaturated dione (III') in 50 ml. of 0.2 percent triethylamine in 95 percent aqueous ethanol is hydrogenated at room temperature and pressure over 5 percent palladium-on-charcoal until one equivalent of hydrogen is absorbed (about 15 minutes). The mixture is filtered and the filtrate evaporated to yield the saturated dione (IV').

A mixture of 20 mg. of the dione (IV'), 10 ml. of methanol 1 ml. of water and 0.5 g. of potassium hydroxide is heated under reflux for 2.5 hours under nitrogen. The mixture is allowed to cool and then evaporated under vacuum. The residue is taken up in ether, washed, dried over sodium sulfate, and evaporated to dryness to yield the t-butyl ether of 19-nortestosterone (V'; $R^4$ is methyl).

A mixture of 15 mg. of the dione (IV'), 5 ml. of methanol, 1 ml. of water and 2 ml. of 37 percent hydrochloric acid is refluxed under nitrogen for 3 hours. The solvent is removed under vacuum and isolation with ether gives 19-nortestosterone (VI'; $R^4$ is methyl).

The following procedure can be used for preparing the enol lactones of formula I' wherein R' and $R^4$ are as defined therein

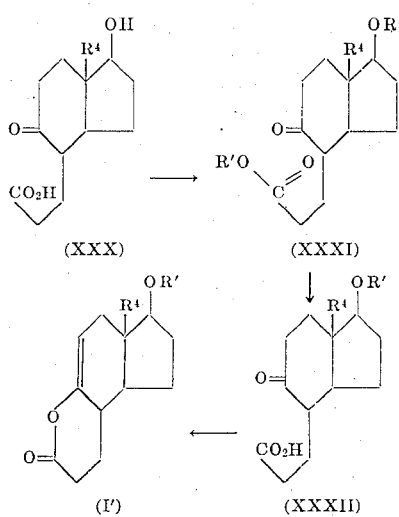

A suspension of 0.5 g. of the hydroxy acid (XXX; $R^4$ is methyl) in 40 ml. of methylene dichloride is cooled to −70° and then 40 ml. of isobutylene and 0.6 ml. of 93 percent sulfuric acid are added. This reaction mixture is shaken for 17 hours in a pressure vessel. The vessel is then recooled to −70°, opened and the solution poured into aqueous sodium bicarbonate with stirring. Isolation with methylene dichloride gave the ester (XXXI).

A mixture of 0.8 g. of the ester (XXXI; $R^4$ is methyl), 50 ml. of ethanol, 10 ml. of water and 5 g. of potassium hydroxide is heated under reflux for 2.5 hours. Solvent is removed, water added, and extraction with ether. The aqueous phase is adjusted to pH 2 and the acid (XXXII) isolated with ether.

A mixture of 0.24 g. of the acid (XXXII; $R^4$ is methyl), 0.6 g. of sodium acetate and 10 ml. of acetic anhydride is refluxed under nitrogen for 4 hours. The reaction mixture is evaporated under vacuum and the residue treated with ether and aqueous sodium bicarbonate. Isolation with ether gave the tricyclic enol lactone (I'; $R^4$ is methyl).

The hydroxy acids XXX can be prepared using the procedure of Velluz, et al., ibid, or French Pat. No. 1,465,400 (1965) by the reaction of the lower alkyl ester of 5-keto-6-heptenoic acid with a 2-loweralkylcyclopentane-1,3-dione (prepared by the method of U.S. Pat. No. 3,318,922) in the presence of base, e.g., triethylamine followed by cyclization with acid hydrolysis, reduction and hydrogenation.

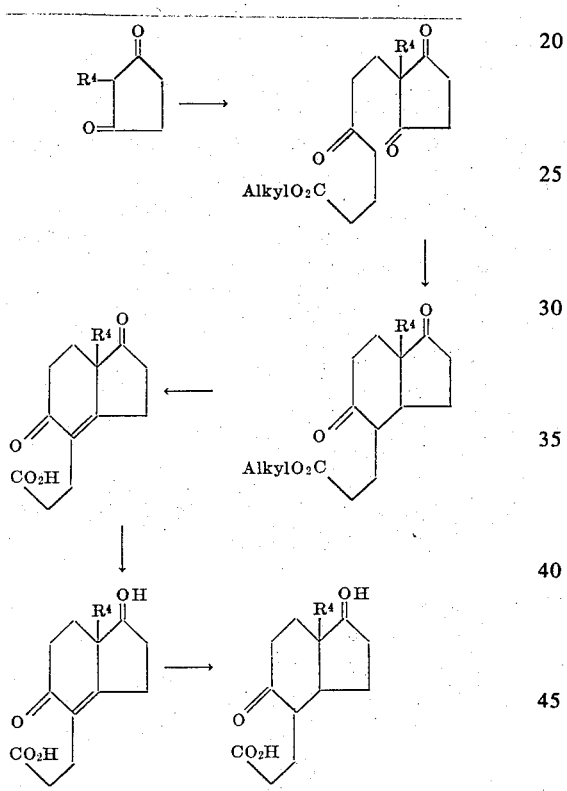

As an alternate method, the hydroxy acid can be prepared by reacting a bicyclic enol lactone of formula XVI (e.g., XVI in which $R^6$ is ethylenedioxy) with 3,3-dimethoxypropylmethylenetriphenylphosphorane followed by hydrolysis to the aldehyde, oxidation of the aldehyde to the acid and then hydrogenation with palladium-on-charcoal. The bicyclic enol lactones (XVI) can be obtained according to the method of French Pat. No. 1,496,817 (1966) using a 2-loweralkylcyclopentane-1,3-dione and ethyl acrylate to yield ethyl β-(1'-loweralkyl-2',5'-dioxocyclopentyl)-propionate. The 2-oxo group is then modified, if desired, using conventional procedures such as forming the corresponding ethylenedioxy or forming the corresponding hydroxyl by reduction and then esterification or etherification and thereafter hydrolysis and cyclization is performed. The tricyclic enol lactones of formula II can be similarly prepared using the method of Netherlands 6,414,702 (1965).

EXAMPLE 16

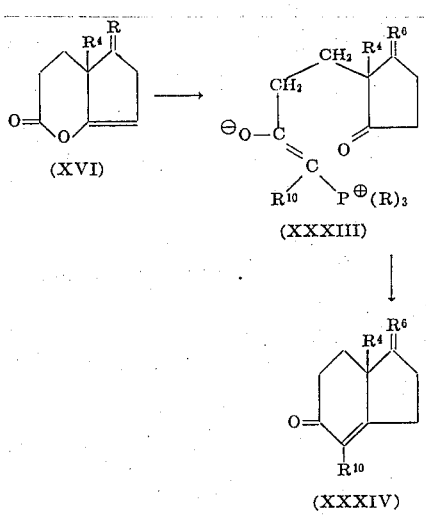

In the above formulas, R, $R^4$ and $R^6$ are as defined hereinabove and $R^{10}$ is hydrogen or one of the following groups:

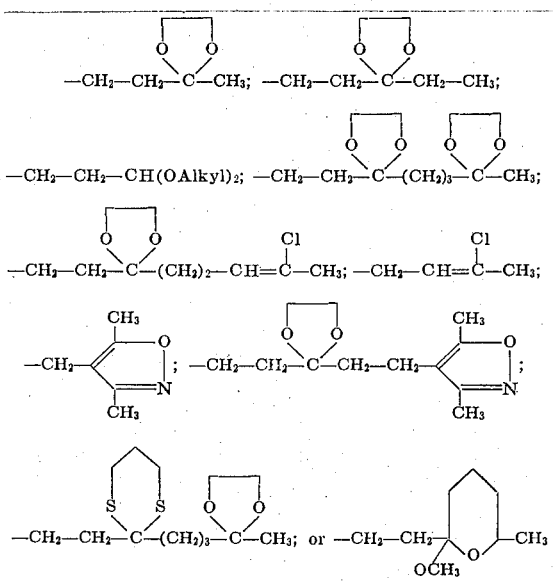

A. To a solution of 4 g. of methylenetriphenylphosphorane in 75 ml. of dry tetrahydrofuran under nitrogen, there is added 1.1 molar equivalents of the bicyclic enol lactone (XVI; $R^4$ is methyl, $R^6$ is ethylenedioxy) in 100ml. of dry tetrahydrofuran at 0°C. The resulting mixture is stirred at 0°C for about 1 hour and then is diluted with water followed by extraction with ether. The ether extracts are washed, dried and evaporated under reduced pressure to yield the intermediate ylid (XXXIII; R is phenyl, $R^4$ is methyl, $R^6$ is ethylenedioxy, $R^{10}$ is hydrogen).

B. A solution of the intermediate ylid obtained in Part A in 100 ml. of diglyme and 35 ml. of hexamethylphosphoramide is heated at reflux for about 6 hours and then allowed to cool to about room temperature followed by extraction with ether. The ether extracts are washed, dried and evaporated under reduced pressure to yield the bicarbocyclic ketone (XXXIV; $R^4$ is methyl, $R^6$ is ethylenedioxy, $R^{10}$ is hydrogen) which can be further purified by chromatography.

By repeating the process of Part A of this example using the phosphonium ylids shown below in place of methylenetriphenylphosphorane, the corresponding intermediate phosphonium ylids (XXXIII) are obtained which are treated according to Part B of this example yielding the corresponding bicarbocyclic ketones (XXXIV).

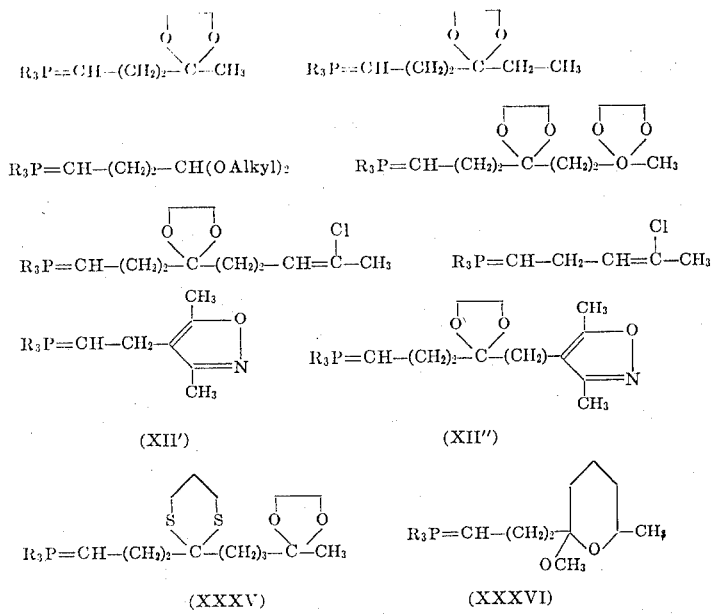

In the above formulas, R is as defined above and alkyl is lower alkyl.

EXAMPLE 17

The process of Part A of Example 16 is repeated using the phosphonium ylids (XXI) in place of methylenetriphenylphosphorane to yield the intermediate ylids (XXXIII) wherein $R^{10}$ is the group

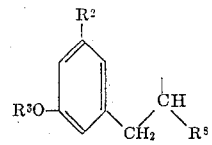

which are treated according to Part B of Example 16 to yield the carbocylic ketones (XXII).

EXAMPLE 18

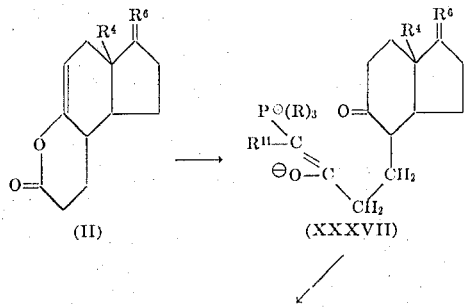

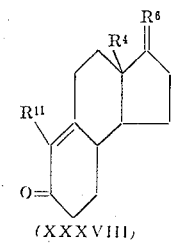

(XXXVIII)

In the above formulas, R, $R^4$ and $R^6$ are as defined hereinabove and $R^{11}$ is hydrogen, methyl or one of the following groups:

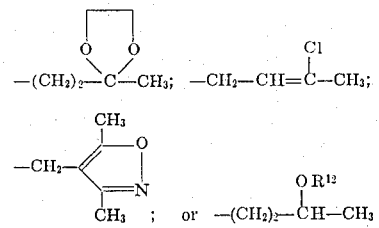

wherein $-OR^{12}$ is a labile ether group convertible into the corresponding hydroxyl such as tetrahydrofuran-2'-yloxy, tetrahydropyran-2'-yloxy, t-butoxy, methoxy, and the like.

The process of Part A of Example 16 is repeated using the tricyclic enol lactone (II; $R^4$ is methyl, $R^6$ is ethylenedioxy) in place of the bicyclic enol lactones (XVI) to yield an intermediate ylid (XXXVII; $R^4$ is methyl, $R^6$ is ethylenedioxy, $R^{11}$ is hydrogen, R is phenyl) which is subjected to the procedure of Part B of Example 16 to yield a tricarbocyclic ketone (XXXVIII; $R^4$ is methyl, $R^6$ is ethylenedioxy, $R^{11}$ is hydrogen).

The other intermediate ylids and tricarbocyclic ketones of formulas XXXVII and XXXVIII, respectively, are also prepared by the foregoing procedure using the following phosphonium ylids:

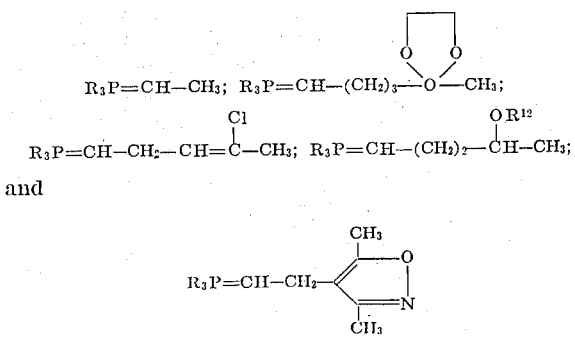

EXAMPLE 19

A mixture of 0.5 moles of 1,3-dithiane and 300 ml. of tetrahydrofuran cooled to −30° is treated with 0.5 molar equivalents of 1.5 molar n-butyl lithium in hexane under nitrogen and stirred for 15 hours at −20°. Then 0.5 moles of the tetrahydropyranyl ether of 3-bromopropanol in 200 ml. of tetrahydrofuran is added slowly with stirring at −5° and then left for 14 hours at 0° under nitrogen. The resulting mixture is cooled to −30° and treated with an additional 0.5 molar equivalents of 1.5 molar n-butyl lithium in hexane. After 1.5 hours, 0.5 moles of 4-chloro-1-bromopent-3-ene in 200 ml. of tetrahydrofuran is added. The reaction mixture is left standing for 18 hours at 0° and then allowed to warm to room temperature for 4 hours. Water is added and the resulting mixture extracted with ether. The ether extracts are combined, washed with water, dried and concentrated. The resulting dialkylated thiane (XXXIX) is dissolved in methanol and stirred for two hours with 20 ml. of 1 percent oxalic acid solution. The reaction mixture is poured into water containing an excess of sodium carbonate solution and then extracted with ether to afford the corresponding free hydroxy compound. A mixture of 2 g. of the free hydroxy compound and 30 ml. of methylene chloride:pyridine (2:1) is cooled to −70° and then treated with one equivalent of tosyl chloride in methylene chloride. The mixture is left standing at 0° for 18 hours and then allowed to warm to room temperature. The mixture is then diluted with water and the resulting tosylate isolated by extraction with methylene chloride and purified by chromatography. The thus-obtained tosylate is dissolved in dry ethylene glycol containing 0.5 g. of mercuric chloride. This reaction mixture is allowed to stand overnight and then heated to 60° for 5 hours. After cooling, water is added and the corresponding ketal isolated by extraction with ether. The ketal (0.5 g.) in 25 ml. of dry isopropanol and 0.5 g. of lithium bromide is refluxed for 12 hours. After cooling, the reaction mixture is diluted with water and extracted with ether. The resulting bromide (XL) is treated with triphenylphosphine in benzene to afford the phosphonium bromide (XLI; R is phenyl, x is bromo) which on treatment with butyl lithium gives the corresponding ylid.

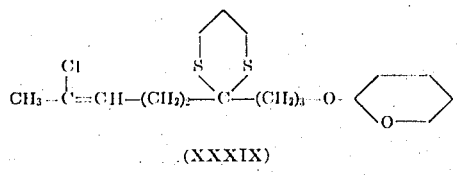

(XXXIX)

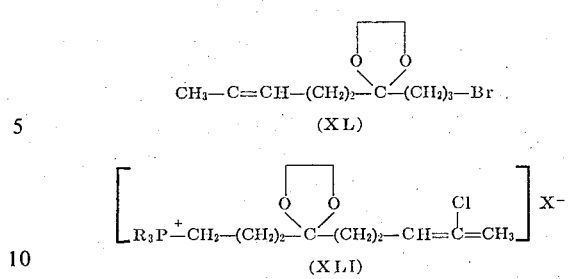

In the above formula, R is as defined above and x is chloro, bromo or iodo.

By using lithium chloride or lithium iodide in the above process, the phosphonium chloride or phosphonium iodide are obtained.

By using other tri-substituted phosphines, e.g., tricyclohexyl, tribenzyl, tritolyl, trimethyl, tributyl, and the like, in place of triphenylphosphine, the corresponding tri-substituted phosphonium compounds (XLI) are obtained.

EXAMPLE 20

The procedure of Example 19 is repeated with the exception that 4-chloro-1-bromopent-3-ene is replaced with the bromide (6) of Example 7 and there is obtained the phosphonium halides (XLII) which are converted into the corresponding ylids by treatment with phenyl lithium or butyl lithium.

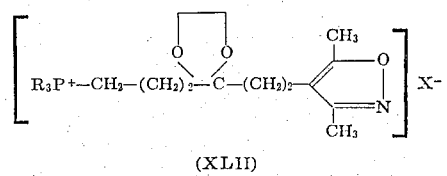

(XLII)

EXAMPLE 21

A suspension of 0.5 g. of 1-chloropentan-4-ol in 40 ml. of methylene chloride is cooled to −70° and then 40 ml. of isobutylene and 0.6 ml. of 93 percent sulfuric acid are added. The mixture is shaken for 17 hours in a pressure vessel. The vessel is then recooled to −70°, opened and the solution poured into aqueous sodium bicarbonate with stirring. Isolation with methylene chloride yields the t-butyl ether of 1-chloropentan-4-ol.

A mixture of 0.5 moles of 1,3-dithiane and 300 ml. of tetrahydrofuran cooled to −30° is treated with 0.5 molar equivalents of 1.5 molar n-butyl lithium in hexane under nitrogen and stirred for 15 hours at −20°. Then 0.5 moles of the tetrahydropropyranyl ether of 3-bromopropanol in 200 ml. of tetrahydrofuran is added slowly with stirring at −5° and then left for 14 hours at 0° under nitrogen. The resulting mixture is cooled to −30° and treated with an additional 0.5 molar equivalents of 1.5 molar n-butyl lithium in hexane. After 1.5 hours, 0.5 moles of the t-butyl ether of 1-chloropentan-4-one in 200 ml. of tetrahydrofuran is added. The reaction mixture is left standing for 18 hours at 0° and then allowed to warm to room temperature for 4 hours. Water is added and the resulting mixture extracted with ether. The ether extracts are combined, washed with water, dried and concentrated. The resulting dialkylate thiane (XLIII) is dissolved in methanol and stirred for 0.5 hour with 20 ml. of 1 percent oxalic acid solution. The reaction mixture is poured into water containing an excess of sodium carbonate solution and then extracted with ether to afford the corresponding free hydroxy compound. A mixture of 2 g. of the free hydroxy compound and 30 ml. of methylene chloride:pyridine (2:1) is cooled to −70° and then treated with one equivalent of tosyl chloride in methylene chloride. The mixture is left standing at 0° for 18 hours and then allowed to warm to room temperature. The mixture is then diluted with water and the resulting tosylate isolated by extraction with methylene chloride and purified by chromatography. The tosylate is dissolved in dry ethylene glycol containing 0.5 g. of mercuric chloride. The mixture is allowed to stand overnight and then heated to 60° for 5 hours. After cooling, water is added and the tosylate of the ketal (XLIV) isolated by extraction with ether. The ketal (XLIV) is cyclized by treatment in methanol containing hydrogen chloride at 25° for about 12 hours to give the tosylate of XLV which is converted into the corresponding bromide by treatment with lithium bromide in isopropanol as described above. The bromide is treated with triphenylphosphine in benzene to afford the phosphonium bromide (XLVI; R is phenyl, x is bromo) which by treatment with butyl lithium or phenyl lithium gives the corresponding ylid.

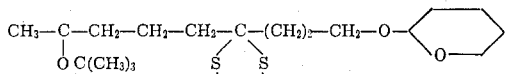

(XLIII)

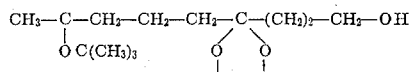

(XLIV)

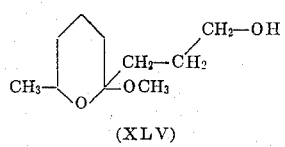

(XLV)

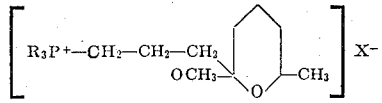

(XLVI)

In the above formula, R and x are as defined above. The other phosphonium halides of formula XLVI can be prepared similarly by using lithium chloride, lithium iodide or sodium iodide in place of lithium bromide and using other tri-substituted phosphines in place of triphenylphosphine.

EXAMPLE 22

A solution of 20.9 g. of the ethylene ketal of ethyl 3-bromopropyl ketone (obtained by treating the ketone with ethylene glycol in benzene in the presence of p-toluenesulfonic acid) in 100 ml. of benzene is refluxed with 20 g. of triphenylphosphine for 2 hours. The mixture is cooled, filtered and the solid material thus collected washed and dried to yield the phosphonium bromide (XLVII; R is phenyl, x is bromo) which is converted to the ylid by treatment with butyl lithium.

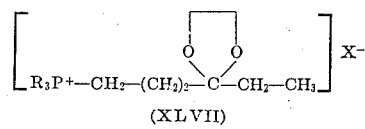

(XLVII)

In the above formula, R and x are as defined above.

The 1-halo-4-alkanone compounds can be prepared, for example, by procedures described in German Pat. No. 801,276 (Dec., 1950) or Jager et al., Arch. Pharm. 293, 896 (1960).

EXAMPLE 23

A mixture of 0.5 moles of 1,3-dithiane and 300 ml. of tetrahydrofuran cooled to −30° is treated with 0.5 molar equivalents of 1.5 molar n-butyl lithium in hexane under nitrogen and stirred for 15 hours at −20°. Then 0.5 moles of the ethylene ketal of methyl 3-bromopropyl ketone in 200 ml. of tetrahydrofuran is added slowly with stirring at −5° and then left for 14 hours at 0° under nitrogen. The resulting mixture is cooled to −30° and treated with an additional 0.5 molar equivalents of 1.5 molar n-butyl lithium in hexane. After 1.5 hours, 0.5 moles of 1-bromo-3-iodopropane in 200 ml. of tetrahydrofuran is added. The resulting mixture is left standing for 18 hours at 0°C and then allowed to warm to room temperature and stand for 4 hours. Water is added and the resulting mixture extracted with ether. The ether extracts are combined, washed with water, dried and evaporated to yield the 1-bromo compound (XLVIII). The 1-bromo compound (XLVIII) is dissolved in dry ethylene glycol containing 0.5 g. of mercuric chloride. The mixture is allowed to stand overnight and then heated to 60° for 5 hours. After cooling, water is added and the corresponding diketal (XLIX) isolated by extraction with ether. The diketal (XLIX) is treated with triphenylphosphine in benzene to afford the phosphonium bromide (L; R is phenyl, x is bromo) which on treatment with butyl or phenyl lithium gives the corresponding ylid. The 1-bromo compound (XLVIII) can be similarly treated with triphenylphosphine to yield the phosphonium bromide (L; R is phenyl, x is bromo) which can be converted into the corresponding ylid.

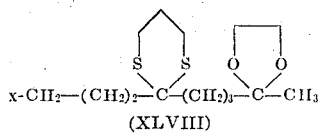

(XLVIII)

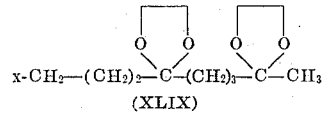

(XLIX)

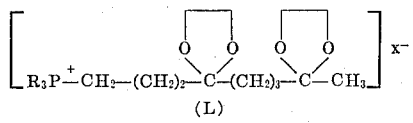

(L)

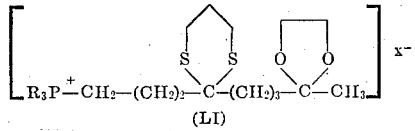

(LI)

In the above formulas, R and x are as defined hereinabove. Similarly, other tri-substituted phosphines can be used in place of triphenylphosphine to prepare other compounds of formulas L and LI wherein R is as defined above.

Example 16 is repeated using an enol lactone (XVI) in which $R^4$ is methyl and $R^6$ is

wherein $R^7$ is t-butoxy to afford the corresponding intermediate ylids (XXXIII) and bicarbocyclic compounds (XXXIV) in which R and $R^{10}$ are as defined therein, $R^4$ is methyl and $R^6$ is

in which $R^7$ is t-butoxy.

Similarly, Example 17 is repeated using the t-butyl ether of enol lactone (XVI) as the starting material.

EXAMPLE 24

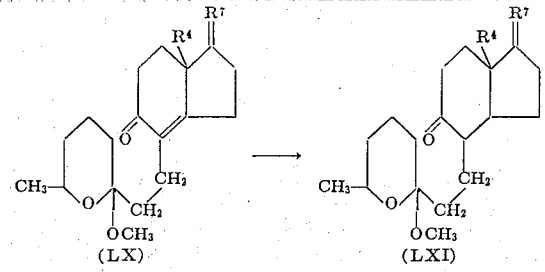

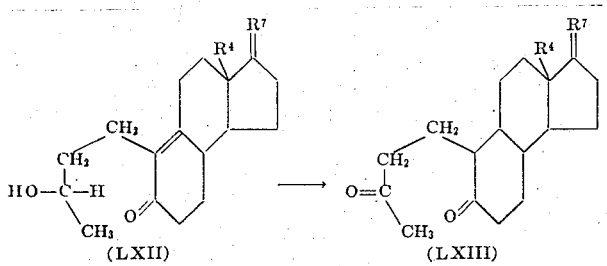

Two grams of the unsaturated bicarbocyclic ketone (LX; $R^4$ is methyl, $R^7$ is ethylenedioxy) in 25 ml. of 0.2 percent triethylamine and 100 ml. of 95 percent aqueous ethanol is hydrogenated at room temperature and room pressure over 5 percent palladium-on-charcoal until one equivalent of hydrogen is absorbed. The mixture is filtered and the filtrate evaporated to yield the corresponding saturated bicarbocyclic ketone (LXI).

A mixture of one gram of the saturated bicarbocyclic ketone (LXI), 100 ml. of methanol, 10 ml. of water and 20 ml. of 37 percent hydrochloric acid is heated at reflux for 2 hours under nitrogen. The solvent is removed under reduced pressure and isolation with ether affords the unsaturated tricarbocyclic diketone (LXII; $R^7$ is oxo) which is hydrogenated using the procedure described above to yield the corresponding saturated tricarbocyclic diketone which is subjected to oxidation using chromium trioxide in pyridine or Jones reagent to yield saturated triketone (LXIII).

Other compounds of formula LX (prepared as described in Example 16) can be used in the above procedure to obtain other useful intermediates of formula LXIII.

EXAMPLE 25

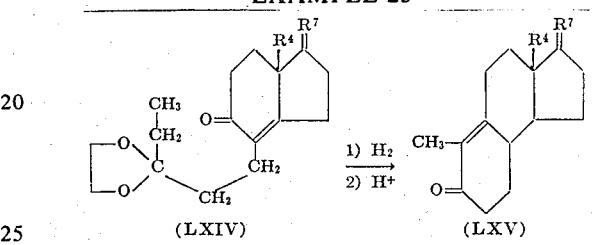

An unsaturated bicarbocyclic ketone (LXIV; $R^4$ is ethyl, $R^7$ in ethylenedioxy) is hydrogenated to the corresponding unsaturated bicarbocyclic ketone which is cyclized using hydrochloric acid according to the procedure of the previous example to afford the tricarbocyclic ketone (LXV) in which $R^4$ is ethyl and $R^7$ is oxo. The compound LXV is an intermediate for $\Delta^4$-androstenes or retro-steroids using the procedure of, for example, Netherlands Pat. No. 6,707,919 (1967).

EXAMPLE 26

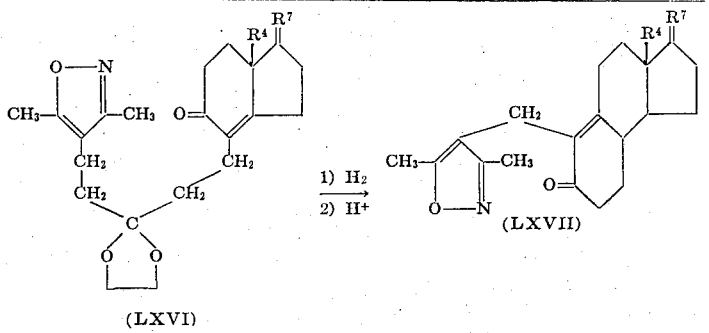

The unsaturated bicarbocyclic ketone (LXVI; $R^4$ is methyl; $R^7$ is ethyenedioxy) is hydrogenated over palladium-on-charcoal using the procedure described above to give the corresponding saturated bicarbocyclic ketone which is cyclized using acid by the procedures described above to yield the tricarbocyclic ketone (LXVII; $R^4$ is methyl, $R^7$ is oxo) which can be converted into 19-nor steroids by methods disclosed in *Journal of the American Chemical Society* 82, No. 21, 5,464 (1967).

EXAMPLE 27

The bicarbocyclic ketone (LXVIII; $R^7$ is ethylenedioxy) is subjected to the procedure of Example 25 to yield the tricarbocyclic ketone (LXIX; $R^7$ is oxo).

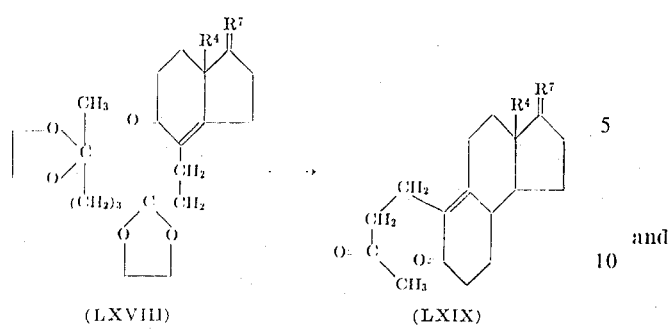

(LXVIII)　　　　(LXIX)

Similarly, the bicarbocyclic ketone (LXX; $R^7$ is ethylenedioxy) can be converted into the tricarbocyclic ketone (LXIX; $R^7$ is oxo).

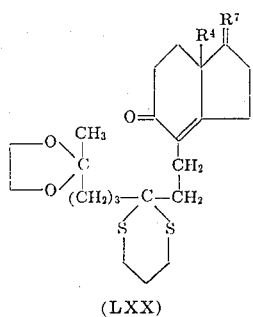

(LXX)

EXAMPLE 28

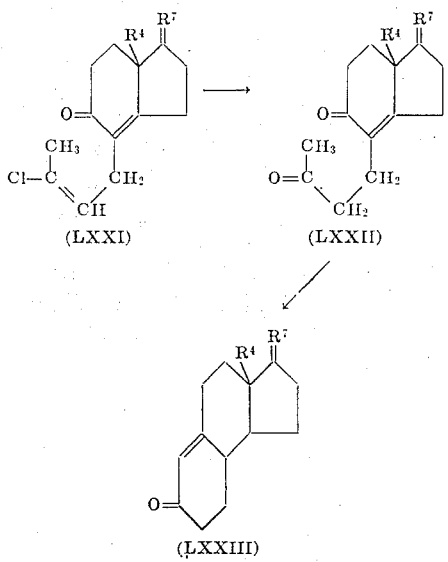

The bicarbocyclic ketone (LXXI; $R^7$ is ethylenedioxy) is treated with acid using the procedure of U.S. Pat. No. 3,050,550 to give the triketone (LXXII; $R^7$ is oxo) which is hydrogenated over palladium-on-charcoal and then cyclized using acid to the tricarbocyclic diketone (LXXIII).

What is claimed is:

1. A process for preparing α,β-unsaturated carbocyclic ketones which comprises the step of reacting, under anhydrous conditions, in an organic solvent inert to the reaction, an enol lactone selected from the group having the formulas:

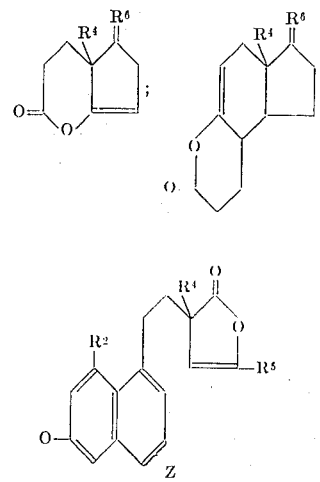

and

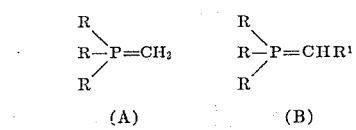

wherein $R^2$ is hydrogen or lower alkoxy; $R^3$ is lower alkyl; $R^4$ is methyl or ethyl; $R^5$ is hydrogen or methyl; $R^6$ is oxo or lower alkylenedioxy thereof; or the group $$\overset{R^7}{\underset{|}{\phantom{X}}\ldots H}$$

in which $R^7$ is hydroxy or a carboxylic ester or labile ether thereof; and Z is a carbon to carbon single or double bond;

with at least an equal molar amount of a phosphonium ylid selected from the group having the formulas:

$$\begin{array}{cc} R\diagdown \\ R-P=CH_2 \\ R\diagup \end{array} \qquad \begin{array}{cc} R\diagdown \\ R-P=CHR^1 \\ R\diagup \end{array}$$

(A) 　　　　(B)

wherein R is independently selected from the group consisting of lower alkoxy having one to six carbon atoms, phenyl, tolyl, anisyl and chlorophenyl; and $R_1$ is selected from the group of methyl and the group having the formulas:

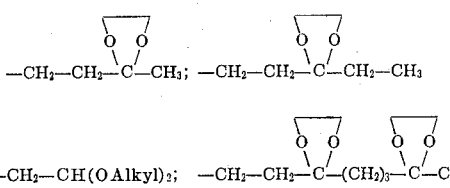

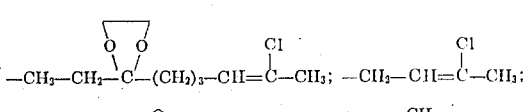

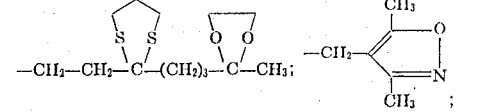

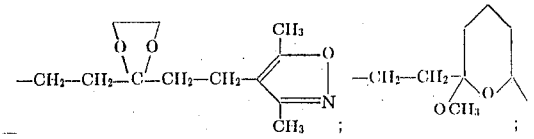

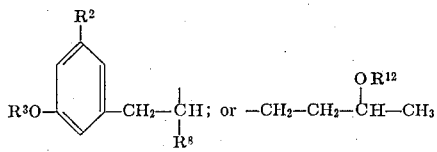

wherein alkyl and $R^3$ are independently lower alkyl having from one to six carbon atoms; $R^2$ is hydrogen or lower alkoxy having from one to six carbon atoms; $R^8$ is hydrogen or methyl and $-OR^{12}$ is a labile ether group; and wherein when said ylid has the formula B wherein R is a carbocyclic radical and $R^1$ has the formula

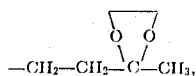

then said enol lactone cannot have the formula:

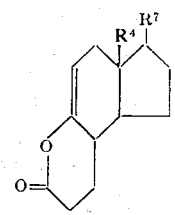

wherein $R^4$ is methyl or ethyl and $R^7$ is t-butoxy.

2. The process according to claim 1 wherein R is a member selected from the group consisting of phenyl, tolyl, anisyl and chlorophenyl.

3. The process of claim 1 wherein said lactone is a bicyclic enol lactone of the formula:

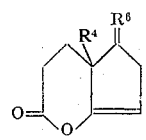

wherein $R^4$ is methyl or ethyl and $R^6$ is oxo or a lower alkylenedioxy thereof or the group

in which $R^7$ is hydroxy or a carboxylic ester or labile ether thereof.

4. The process of claim 3 wherein said phosphonium ylid is an ylid of formula A.

5. The process of claim 3 wherein said ylid is an ylid of formula B wherein $R^1$ is one of the groups:

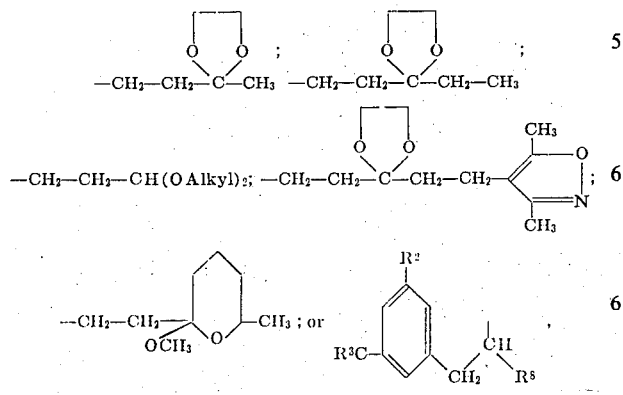

in which alkyl is lower alkyl, $R^2$ is hydrogen or lower alkoxy, $R^3$ is lower alkyl and $R^8$ is hydrogen or methyl.

6. The process of claim 1 wherein said lactone is a tricyclic enol lactone of the formula:

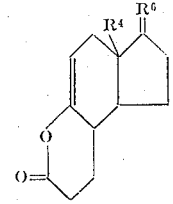

wherein $R^4$ is methyl or ethyl and $R^6$ is oxo or a lower alkylenedioxy thereof or the group

in which $R^7$ is hydroxy or a carboxylic ester or labile ether thereof.

7. The process of claim 6 wherein said phosphonium ylid is an ylid of formula A in which R is phenyl.

8. The process of claim 6 wherein said phosphonium ylid is an ylid of formula B wherein $R^1$ is methyl or one of the groups:

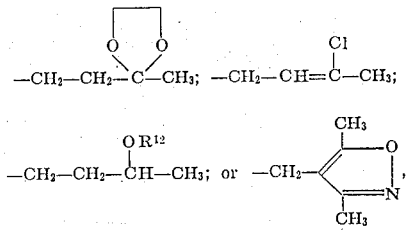

in which $-OR^{12}$ is a labile ether group.

9. The process of claim 1 wherein said lactone is a tetracarbocyclic enol lactone of the formula:

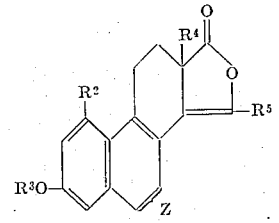

wherein $R^2$ is hydrogen or lower alkoxy, $R^3$ is lower alkyl, $R^4$ is methyl or ethyl, $R^5$ is hydrogen or methyl, and Z is a carbon to carbon single or double bond.

10. The process of claim 3 wherein said ylid is an ylid of formula B wherein $R^1$ is one of the groups:

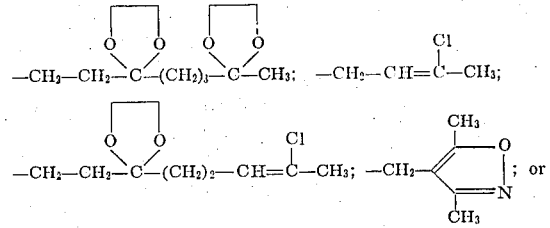

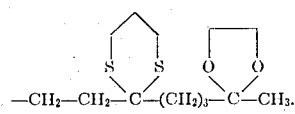

11. The process according to claim 5 wherein $R^6$ is lower alkylenedioxy or the group

in which $R^7$ is a labile ether group.

12. The process of claim 5 including the step of adding lower monohydric alkanol or lower monohydric alkanol and a base selected from alkali metal hydroxides or alkali metal alkoxides selected from the group consisting of sodium methoxide, sodium ethoxide, potassium methoxide, and sodium t-butoxide, subsequent to the substantial disappearance of said ylid of formula B and wherein said reaction is conducted at a temperature of from room temperature to reflux temperature.

13. The process of claim 5 including the step of adding a dipolar aprotic solvent subsequent to the substantial disappearance of said ylid of formula B and said reaction is conducted at a temperature of from room temperature to reflux temperature.

14. The process of claim 13 wherein the dipolar aprotic solvent is hexamethylphosphoramide and said reaction is conducted at reflux temperature.

15. The process of claim 5 wherein said organic solvent is diglyme and said reaction is conducted at reflux temperature.

16. The process of claim 6 including the step of adding lower monohydric alkanol or lower monohydric altanol and a base selected from alkali metal hydroxides or alkali metal alkoxides selected from the group consisting of sodium methoxide, sodium ethoxide, potassium methoxide, and sodium t-butoxide, subsequent to the substantial disappearance of said ylid of formula B and wherein said reaction is conducted at a temperature of from room temperature to reflux temperature.

17. The process of claim 6 including the step of adding a dipolar aprotic solvent subsequent to the substantial disappearance of said ylid of formula B and said reaction is conducted at a temperature of from room temperature to reflux temperature.

18. The process of claim 17 wherein the dipolar solvent is hexamethylphosphoramide and said reaction is conducted at reflux temperature.

19. The process of claim 6 wherein said organic solvent is diglyme and said reaction is conducted at reflux temperature.

20. The process of claim 12 wherein $R^6$ is lower alkylenedioxy or

wherein $R^7$ is a labile ether group.

21. The process of claim 13 wherein $R^6$ is lower alkylenedioxy or

wherein $R^7$ is a labile ether group.

22. The process of claim 1 including the step of adding lower monohydric alkanol or lower monohydric alkanol and a base selected from alkali metal hydroxides or alkali metal alkoxides selected from the group consisting of sodium methoxide, sodium ethoxide, potassium methoxide, and sodium t-butoxide, subsequent to the substantial disappearance of said ylid of formula B and wherein said reaction is conducted at a temperature of from room temperature to reflux temperature.

23. The process according to claim 22 wherein R is a member selected from the group consisting of phenyl, tolyl, anisyl and chlorophenyl.

24. The process of claim 1 including the step of adding a dipolar aprotic solvent subsequent to the substantial disappearance of said ylid of formula A or B and said reaction is conducted at a temperature of from room temperature to reflux temperature.

25. The process of claim 24 wherein said dipolar aprotic solvent is hexamethylphosphoramide.

26. The process of claim 25 wherein R is a member selected from the group consisting of phenyl, tolyl, anisyl and chlorophenyl.

27. The process of claim 1 wherein said organic solvent is diglyme and said reaction is conducted at reflux temperature.

28. The process of claim 16 wherein in said step there is added lower monohydric alkanol and base and $R^6$ is lower alkylenedioxy or

in which $R^7$ is a labile ether group.

29. The process of claim 17 wherein said dipolar aprotic solvent is hexamethylphosphoramide and $R^6$ is lower alkylenedioxy or

in which $R^7$ is a labile ether group.

30. The process of claim 3 wherein R is phenyl.

31. The process of claim 9 wherein R is phenyl.

* * * * *

UNITED STATES PATENT AND TRADEMARK OFFICE
CERTIFICATE OF CORRECTION

PATENT NO. : 3,859,309
DATED : January 7, 1975
INVENTOR(S) : JOHN H. FRIED

It is certified that error appears in the above-identified patent and that said Letters Patent are hereby corrected as shown below:

Column 34, lines 16-16, that portion of the formula reading

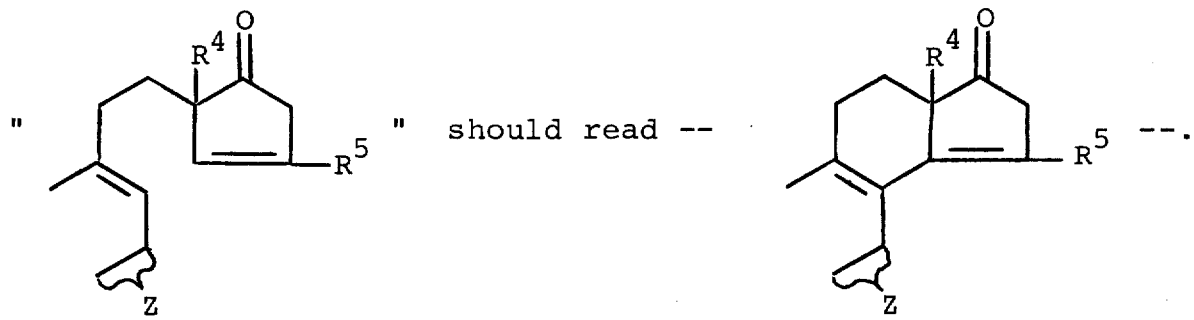

Column 35, line 66, that portion of the formula reading

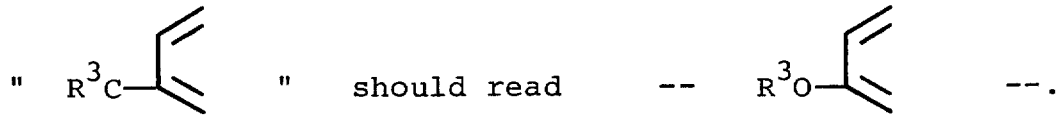

Signed and Sealed this

Thirtieth Day of November 1976

[SEAL]

Attest:

RUTH C. MASON
Attesting Officer

C. MARSHALL DANN
Commissioner of Patents and Trademarks